United States Patent
Olekas et al.

(10) Patent No.: US 10,438,468 B2
(45) Date of Patent: *Oct. 8, 2019

(54) MOTION LOCALIZATION IN A WIRELESS MESH NETWORK BASED ON MOTION INDICATOR VALUES

(71) Applicant: Cognitive Systems Corp., Waterloo (CA)

(72) Inventors: Christopher Vytautas Olekas, Breslau (CA); Dustin Griesdorf, Waterloo (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,971

(22) Filed: Sep. 5, 2018

(65) Prior Publication Data

US 2019/0122514 A1 Apr. 25, 2019

Related U.S. Application Data

(63) Continuation of application No. 15/789,761, filed on Oct. 20, 2017, now Pat. No. 10,109,167.

(51) Int. Cl.
*G08B 13/24* (2006.01)
*H04W 4/70* (2018.01)
(Continued)

(52) U.S. Cl.
CPC ......... *G08B 13/24* (2013.01); *G08B 13/2491* (2013.01); *H04W 4/70* (2018.02);
(Continued)

(58) Field of Classification Search
CPC ... G08B 13/24; G08B 13/2491; H04W 4/005; H04W 84/18; H04W 4/70; H04W 4/02; H04W 4/20
See application file for complete search history.

(56) References Cited

U.S. PATENT DOCUMENTS

| | | |
|---|---|---|
| 4,054,879 A | 10/1977 | Wright et al. |
| 4,075,573 A | 2/1978 | Kennedy et al. |

(Continued)

FOREIGN PATENT DOCUMENTS

| | | |
|---|---|---|
| CA | 2834522 | 5/2014 |
| CA | 2945702 | 8/2015 |

(Continued)

OTHER PUBLICATIONS

Youssef, Moustafa et al, "Challenges: Device-free Passive Localization for Wireless Environments," MobiCom '07 Proceedings of the 13th Annual ACM International Conference on Mobile Computing and Networking, Sep. 2007, pp. 222-229.*

(Continued)

*Primary Examiner* — Nay Tun
(74) *Attorney, Agent, or Firm* — Henry Patent Law Firm PLLC

(57) ABSTRACT

In a general aspect, a location of detected motion in a space is determined. In some aspects, motion of an object in a space is detected based on wireless signals communicated through the space by a wireless communication system that includes multiple wireless communication devices. Each wireless signal is transmitted and received by a respective pair of the wireless communication devices. Motion indicator values are computed for the respective wireless communication devices. The motion indicator value for each individual wireless communication device represents a degree of motion detected by the individual wireless communication device based on a subset of the wireless signals transmitted or received by the individual wireless communication device. A location of the detected motion in the space is determined based on the motion indicator values.

24 Claims, 9 Drawing Sheets

(51) Int. Cl.
H04W 84/18 (2009.01)
H04W 4/02 (2018.01)
H04W 4/20 (2018.01)

(52) U.S. Cl.
CPC ............... *H04W 4/02* (2013.01); *H04W 4/20* (2013.01); *H04W 84/18* (2013.01)

(56) References Cited

U.S. PATENT DOCUMENTS

| | | |
|---|---|---|
| 4,193,055 A | 3/1980 | Barnum |
| 4,225,858 A | 9/1980 | Cole et al. |
| 4,286,260 A | 8/1981 | Gershberg et al. |
| 4,649,388 A | 3/1987 | Atlas |
| 4,740,045 A | 4/1988 | Goodson et al. |
| 4,870,663 A | 9/1989 | Kulju et al. |
| 5,270,720 A | 12/1993 | Stove |
| 5,519,400 A | 5/1996 | McEwan |
| 5,696,514 A | 12/1997 | Nathanson et al. |
| 6,075,797 A | 6/2000 | Thomas |
| 6,493,380 B1 | 12/2002 | Wu et al. |
| 6,573,861 B1 | 6/2003 | Hommel et al. |
| 7,047,015 B2 | 5/2006 | Hawe |
| 7,295,109 B2 | 11/2007 | Kobayashi |
| 7,317,419 B2 | 1/2008 | Sugar et al. |
| 7,652,617 B2 | 1/2010 | Kurtz et al. |
| 7,916,066 B1 | 3/2011 | Osterweil |
| 8,138,918 B2 | 3/2012 | Habib |
| 8,331,498 B2 | 12/2012 | Huang et al. |
| 8,477,750 B2 | 7/2013 | Agarwal et al. |
| 8,710,984 B2 | 4/2014 | Wilson et al. |
| 8,818,288 B2 | 8/2014 | Patwari et al. |
| 8,836,344 B2 | 9/2014 | Habib et al. |
| 9,030,321 B2 | 5/2015 | Breed |
| 9,143,413 B1 | 9/2015 | Manku et al. |
| 9,143,968 B1 | 9/2015 | Manku et al. |
| 9,523,760 B1 | 12/2016 | Kravets et al. |
| 9,524,628 B1 | 12/2016 | Omer et al. |
| 9,551,784 B2 | 1/2017 | Katuri et al. |
| 9,584,974 B1 | 2/2017 | Omer et al. |
| 9,743,294 B1 | 8/2017 | Omer et al. |
| 9,927,519 B1 | 3/2018 | Omer et al. |
| 9,933,517 B1 | 4/2018 | Olekas et al. |
| 9,989,622 B1 | 6/2018 | Griesdorf et al. |
| 10,004,076 B1 | 6/2018 | Griesdorf et al. |
| 10,048,350 B1 | 8/2018 | Piao et al. |
| 10,108,903 B1 | 10/2018 | Piao et al. |
| 10,109,167 B1 | 10/2018 | Olekas et al. |
| 10,109,168 B1 | 10/2018 | Devison et al. |
| 10,129,853 B2 | 11/2018 | Manku et al. |
| 2001/0046870 A1 | 11/2001 | Stilp et al. |
| 2003/0007473 A1 | 1/2003 | Strong et al. |
| 2003/0108119 A1 | 6/2003 | Mohebbi et al. |
| 2005/0055568 A1 | 3/2005 | Agrawala et al. |
| 2005/0083199 A1 | 4/2005 | Hall et al. |
| 2006/0217132 A1 | 9/2006 | Drummond-Murray et al. |
| 2007/0293232 A1 | 12/2007 | Nonaka |
| 2007/0296571 A1 | 12/2007 | Kolen |
| 2008/0119130 A1 | 5/2008 | Sinha |
| 2008/0240008 A1 | 10/2008 | Backes et al. |
| 2008/0303655 A1 | 12/2008 | Johnson |
| 2009/0040952 A1 | 2/2009 | Cover et al. |
| 2009/0062696 A1 | 3/2009 | Nathan et al. |
| 2009/0079615 A1 | 3/2009 | Wu et al. |
| 2009/0128302 A1 | 5/2009 | Srinivasan et al. |
| 2009/0128360 A1 | 5/2009 | Bianchi et al. |
| 2010/0013636 A1 | 1/2010 | Wu |
| 2010/0026490 A1 | 2/2010 | Butler et al. |
| 2010/0103020 A1 | 4/2010 | Wu |
| 2010/0130229 A1 | 5/2010 | Sridhara et al. |
| 2010/0315284 A1 | 12/2010 | Trizna et al. |
| 2011/0130092 A1 | 6/2011 | Yun et al. |
| 2011/0148689 A1 | 6/2011 | Filippi et al. |
| 2011/0199304 A1 | 8/2011 | Walley et al. |
| 2012/0009882 A1 | 1/2012 | Patwari et al. |
| 2012/0011365 A1 | 1/2012 | Schmidt et al. |
| 2012/0115512 A1 | 5/2012 | Grainger et al. |
| 2012/0146788 A1 | 6/2012 | Wilson et al. |
| 2012/0184296 A1 | 7/2012 | Milosiu |
| 2012/0212366 A1 | 8/2012 | Alalusi |
| 2013/0005280 A1 | 1/2013 | Leung et al. |
| 2013/0090151 A1 | 4/2013 | Ngai et al. |
| 2013/0162459 A1 | 6/2013 | Aharony et al. |
| 2013/0283256 A1 | 10/2013 | Proud |
| 2014/0004874 A1 | 1/2014 | Schwartz et al. |
| 2014/0015706 A1 | 1/2014 | Ishihara et al. |
| 2014/0128778 A1 | 5/2014 | Chan et al. |
| 2014/0135042 A1 | 5/2014 | Buchheim et al. |
| 2014/0140231 A1 | 5/2014 | Haiut et al. |
| 2014/0247179 A1 | 9/2014 | Furuskog |
| 2014/0285324 A1 | 9/2014 | Austin |
| 2014/0286380 A1 | 9/2014 | Prager et al. |
| 2014/0301260 A1 | 10/2014 | Park et al. |
| 2015/0043377 A1 | 2/2015 | Cholas et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0189528 A1 | 7/2015 | Carbajal |
| 2015/0195100 A1 | 7/2015 | Imes et al. |
| 2015/0212205 A1 | 7/2015 | Shpater |
| 2015/0245164 A1 | 8/2015 | Merrill |
| 2015/0292879 A1 | 10/2015 | Zhou et al. |
| 2015/0338507 A1 | 11/2015 | Oh et al. |
| 2015/0350976 A1 | 12/2015 | Kodali et al. |
| 2015/0356289 A1 | 12/2015 | Brown et al. |
| 2016/0018508 A1 | 1/2016 | Chen et al. |
| 2016/0182170 A1 | 6/2016 | Daoura et al. |
| 2016/0183059 A1 | 6/2016 | Nagy et al. |
| 2016/0187475 A1 | 6/2016 | Horng et al. |
| 2016/0210838 A1 | 7/2016 | Yan et al. |
| 2016/0217417 A1 | 7/2016 | Ma et al. |
| 2016/0241999 A1 | 8/2016 | Chin et al. |
| 2017/0042488 A1 | 2/2017 | Muhsin |
| 2017/0146656 A1 | 5/2017 | Belsley et al. |
| 2017/0195893 A1 | 7/2017 | Lee |
| 2017/0278374 A1 | 9/2017 | Skaaksrud |
| 2017/0280351 A1 | 9/2017 | Skaaksrud |
| 2017/0309146 A1 | 10/2017 | Mackenzie et al. |
| 2017/0343658 A1 | 11/2017 | Ramirez et al. |

FOREIGN PATENT DOCUMENTS

| | | |
|---|---|---|
| WO | 2014/021574 | 2/2014 |
| WO | 2014201574 | 12/2014 |
| WO | 2015/168700 | 11/2015 |
| WO | 2016/110844 | 7/2016 |

OTHER PUBLICATIONS

"Artificial neural network", Wikipedia; https://en.wikipedia.org/wiki/Artificial_neural_network; downloaded Sep. 15, 2017, 39 pgs.
"CEVA; "CEVA's DSP Cores Power the World's Leading Mobile Broadband and M2M Applications"; http://www.ceva-dsp.com/Mobile-Broadband; 3 pages; May 15, 2016"
"Convolutional neural network", Wikipedia; https://en.wikipedia.org/wiki/Convolutional_neural_network; downloaded Sep. 15, 2017, 19 pgs.
"Japan Radio Co., LTD; "26GHz FWA—Technology"; http://www.jrc.co.jp/eng/product/lneup/26ghz_wireless_ip_access_system/tech.html; 3 pages; May 15, 2016."
"Non-Final Office Action received in U.S. Appl. No. 15/099,833, dated Jun. 27, 2016, 16 pages."
"Non-Final Office Action received in U.S. Appl. No. 15/151,571, dated Aug. 5, 2016, 18 pages."
"Notice of Allowance received in U.S. Appl. No. 15/099,833, dated Oct. 14, 2016, 8 pages."
"Notice of Allowance received in U.S. Appl. No. 15/151,571, dated Jan. 10, 2017, 9 pages."
"Notice of Allowance received in U.S. Appl. No. 15/228,418, dated Oct. 12, 2016, 9 pages."
"quora.com; "What is the function of the baseband processor in wireless devices?"; https://ww.quora.com/What-is-the-function-of-the-baesband-processor-in-wireless-devices; 2 pages; May 15, 2016."

(56) References Cited

OTHER PUBLICATIONS

"Wikipedia; "Baseband processor"; rhttps://en.wikipedia.org/wiki/Bandband_processor; 2 pages; version dated Apr. 20, 2016."
Tsironi, et al., "Gesture Recognition with a Convolutional Long Short-Term Memory Recurrent Neural Network", European Symposium on Artificial Neural Networks, Computational Intelligence and Machine Learning, Bruges (Belgium), Apr. 27-29, 2016, 6 pgs.
USPTO, Final Office Action received in U.S. Appl. No. 15/176,489 dated Jun. 23, 2017, 23 pages.
USPTO, Notice of Allowance issued in U.S. Appl. No. 15/460,643 dated Jun. 12, 2017, 34 pages.
USPTO, Non-final Office Action issued in U.S. Appl. No. 15/461,125 dated Apr. 19, 2017, 56 pages.
USPTO, "Non-final Office Action", issued in U.S. Appl. No. 15/176,489 dated Mar. 22, 2017, 41 pages.
Wei, et al., "Radio-based Device-free Activity Recognition with Radio Frequency Interference", IPSN '15 Proceedings of the 14th International Conference on Information Processing in Sensor Networks, Apr. 13-16, 2015, 12 pgs.
Zheng, et al., "Detecting Radio Frequency Interference for CSI Measurements on COTS WiFi Devices", IEEE ICC 2017, Ad-Hoc and Sensor Networking Symposium, May 2017, 6 pgs.
Zheng, et al., "Time Series Classification Using Multi-Channels Deep Convolutional Neural Networks", 2014, 13 pgs.
USPTO; Restriction Requirement dated Jan. 23, 2018, in U.S. Appl. No. 15/706,295.
Canadian Intellectual Property Office, International Search Report and Written Opinion for International Application No. PCT/CA2017/050037 dated Apr. 13, 2017, 12 pages.
USPTO, Notice of Allowance issued in U.S. Appl. No. 15/461,125 dated Aug. 30, 2017, 15 pages.
USPTO, Notice of Allowance dated Jan. 29, 2018, in U.S. Appl. No. 15/461,125, 16 pgs.
USPTO, Notice of Allowance dated Jun. 28, 2018, in U.S. Appl. No. 15/706,295, 16 pgs.
USPTO, Non-Final Office Action issued in U.S. Appl. No. 15/691,195 dated Nov. 15, 2017, 17 pgs.
USPTO, Notice of Allowance dated May 2, 2018, in U.S. Appl. No. 15/691,195, 21 pgs.
Notice of Allowance dated Jun. 22, 2018, in U.S. Appl. No. 15/815,199, 22 pgs.
USPTO, Notice of Allowance dated Feb. 13, 2018, in U.S. Appl. No. 15/683,637, 25 pgs.
USPTO, Notice of Allowance dated Jul. 6, 2018, in U.S. Appl. No. 15/789,761, 26 pgs.
USPTO, Notice of Allowance dated May 1, 2018, in U.S. Appl. No. 15/799,768, 27 pgs.
USPTO, Notice of Allowance dated Jan. 10, 2018, in U.S. Appl. No. 15/803,189, 28 pgs.
USPTO, Non-Final Office Action dated Feb. 7, 2018, in U.S. Appl. No. 15/176,489, 30 pgs.
USPTO, Non-Final Office Action dated Dec. 28, 2017, in U.S. Appl. No. 15/789,761, 31 pgs.
USPTO; Non-Final Office Action dated Jan. 23, 2018, in U.S. Appl. No. 15/789,815, 35 pgs.
USPTO, Final Office Action dated Jul. 5, 2018, in U.S. Appl. No. 15/789,815, 36 pgs.
USPTO, Non-Final Office Action dated Jan. 26, 2018, in U.S. Appl. No. 15/815,199, 36 pgs.
USPTO, Non-Final Office Action dated Mar. 14, 2018, in U.S. Appl. No. 15/706,295, 39 pgs.
USPTO, Notice of Allowance dated Mar. 8, 2018, in U.S. Appl. No. 15/706,193, 40 pgs.
USPTO, Non-Final Office Action dated Mar. 9, 2018, in U.S. Appl. No. 15/836,606, 49 pgs.
USPTO, Restriction Requirement dated Mar. 28, 2018, in U.S. Appl. No. 15/799,806, 5 pgs.
USPTO, Non-Final Office Action received in U.S. Appl. No. 15/799,768 dated Dec. 13, 2017, 7 pgs.
Canadian Intellectual Property Office, International Search Report and Written Opinion issued International Application No. PCT/CA2016/051228 dated Apr. 25, 2017, 8 pages.
WIPO, International Search Report and Written Opinion dated May 18, 2018, in PCT/CA2018/050051, 8 pgs.
Canadian Intellectual Property Office, International Search Report and Written Opinion issued in International Application No. PCT/CA2016/051466 dated Mar. 14, 2017, 9 pages.
CIPO, International Search Report and Written Opinion dated Feb. 9, 2018, in PCT/CA2017/051276, 9 pgs.
CIPO, International Search Report and Written Opinion dated Jan. 26, 2018, in PCT/CA2017/051290, 9 pgs.
WIPO, International Search Report and Written Opinion dated Apr. 25, 2018, in PCT/CA2018/050046, 9 pgs.
"A Guide to TF Layers: Building a Convolutional Neural Network", TensorFlow; https://www.tensorflow.org/tutorials/layers; downloaded Nov. 20, 2017, 17 pgs.
"An Intuitive Explanation of Convolutional Neural Networks", the data science blog; https://ujjwalkarn.me/2016/08/11/intuitive-explanation-convnets/, Sep. 15, 2017, 23 pgs.
"Apple Insider; "Intel to reportedly supply LTD chips for 2016 iPhone"; http://appleinsider.com/articles/15/03/11/intel-to-reportedly-supply-ltd-chips-for-2016-iphone; 2 pages; May 15, 2016."
CIPO, "International Search Report and Written Opinion", in International Application No. PCT/CA2016/051229, dated Jan. 17, 2017, 9 pages.
Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.
Hyder, et al., "Acoustic Scene Classification using a CNN-SuperVector system trained with Auditory and Spectrogram Image Features", Interspeech 2017, Stockholm Sweden, Aug. 20-24, 2017, 5 pgs.
Li, et al., "A Convolutional Neural Network Cascade for Face Detection", IEEE, 2015, 10 pgs.
Netgear, "N600 Will Cable Modem Router, Model C3700 User Manual", https://web.archive.org/web/20150121182848/http://www.downloads.netgear.com/files/GDC/C3700_UM_21Aug2014.pdf (archive of URL http://www.downloads.netgear.com/files/GDC/C3700_UM_21Aug2014.pdf captured on Jan. 21, 2015, Aug. 21, 2014, 101 pages.
OpenWRT, "Wireless Configuration", https://web.archive.org/web/20140402033233/http://wiki.openwrt.org/doc/uci/wireless (capture of URL http://wiki.openwrt.org/doc/uci/wireless on Apr. 2, 2014), 22 pages.
USPTO, Non-Final Office Action dated Nov. 29, 2018, in U.S. Appl. No. 16/148,705, 37 pgs.
WIPO, International Search Report and Written Opinion dated Jul. 24, 2018, in PCT/CA2018/050128, 9 pgs.
Depatala, et al., "Occupancy Estimation Using Only WiFi Power Measurements", IEEE Journal on Selected Areas in Communications, vol. 33, No. 7; pp. 1381-1393, Jul. 2015, 13 pgs.

* cited by examiner

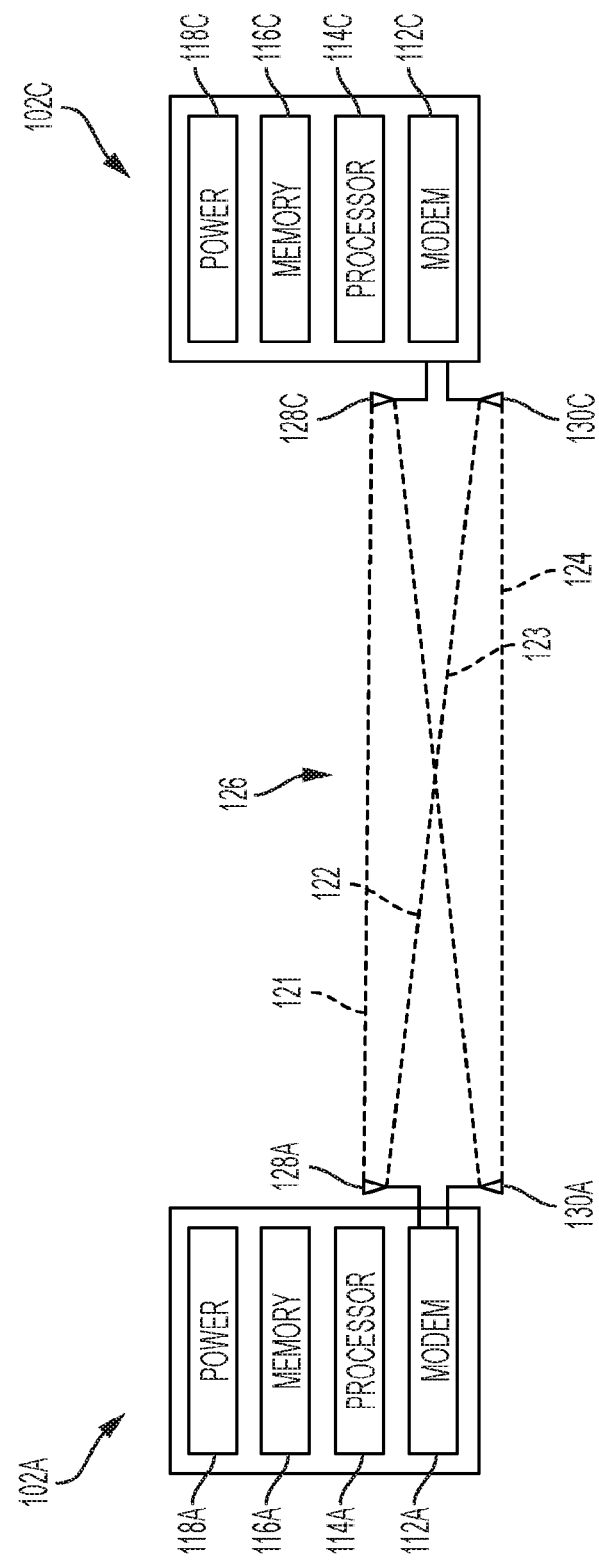

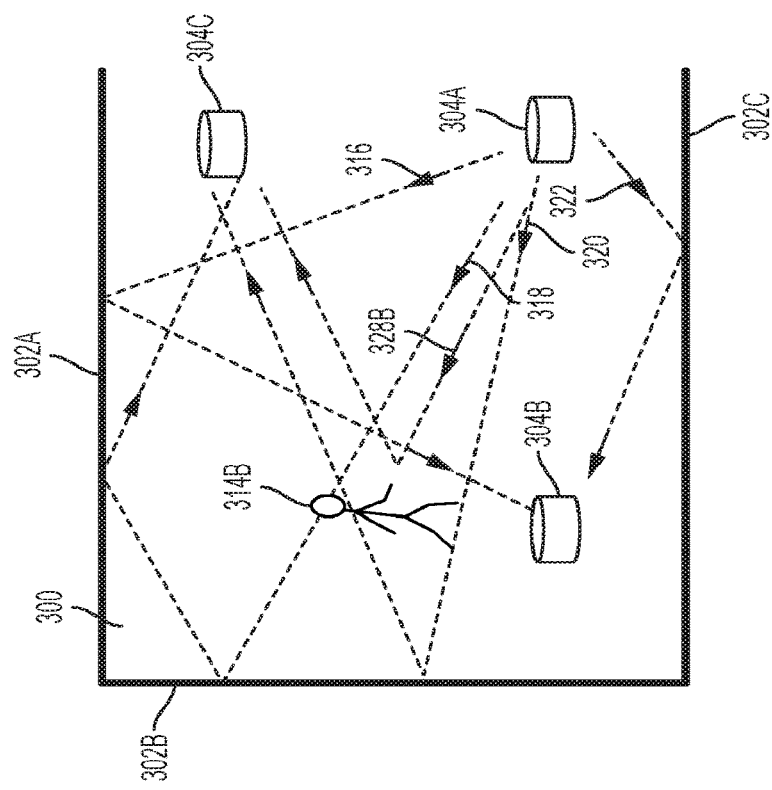
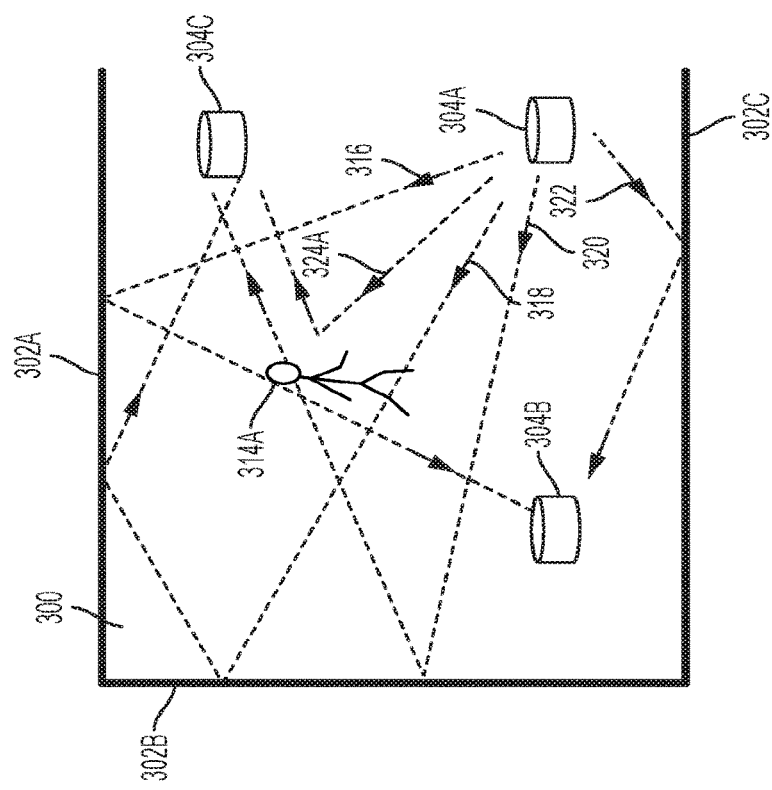

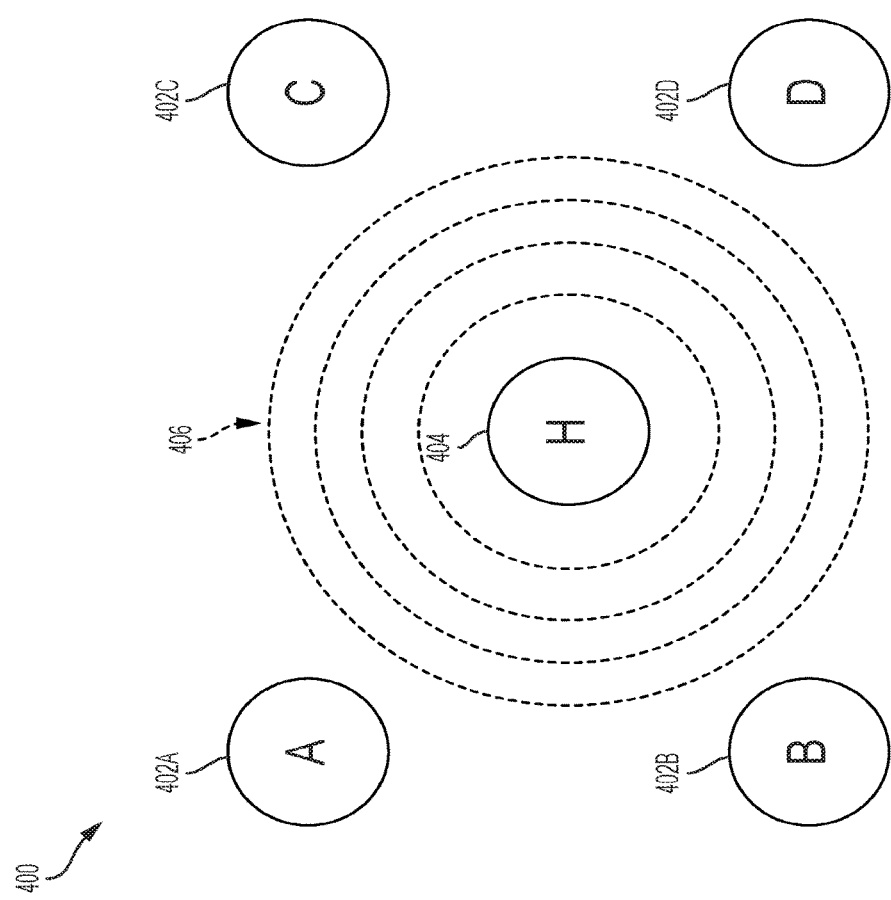

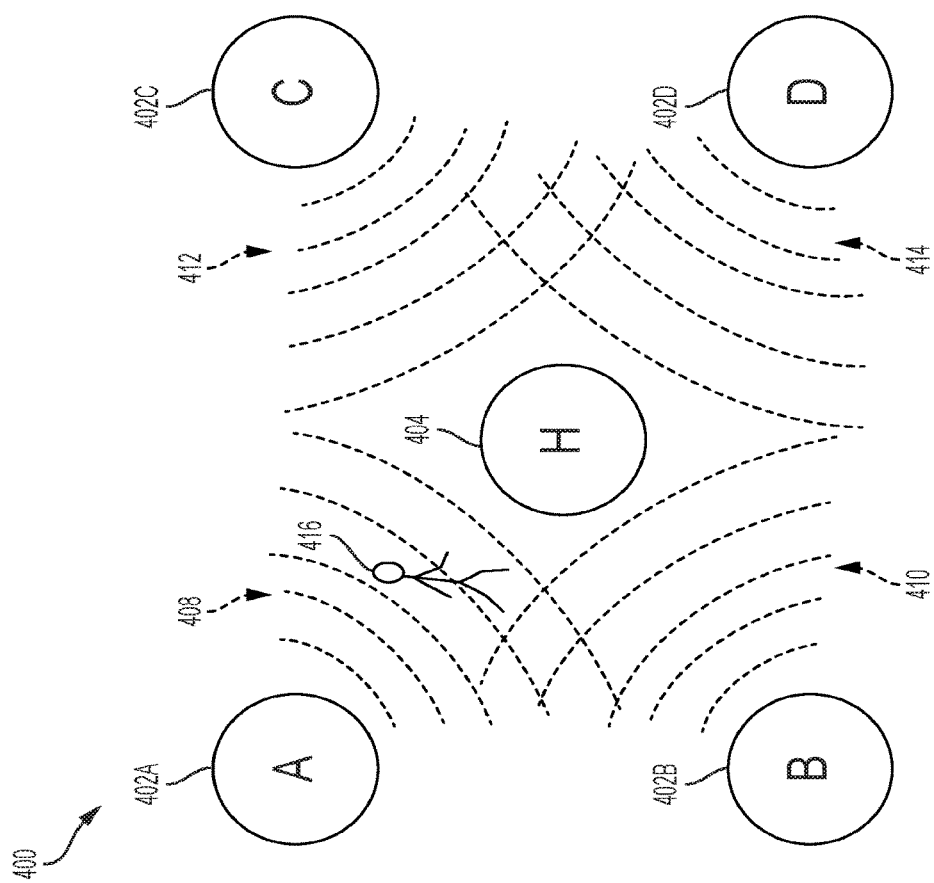

FIG. 5A

Table 510:

| | t0 | t1 | t2 | t3 | t4 | t5 | t6 | t7 | t8 | t9 |
|---|---|---|---|---|---|---|---|---|---|---|
| | BEACON NO. 0 | BEACON NO. 1 | BEACON NO. 2 | BEACON NO. 3 | BEACON NO. 4 | BEACON NO. 5 | BEACON NO. 6 | BEACON NO. 7 | BEACON NO. 8 | BEACON NO. 9 |
| BEACON Tx DEVICE HUB | 999 | 1000 | 1001 | 1002 | 1003 | 1004 | 1005 | 1006 | 1007 | 1008 |
| BEACON Rx BY DEVICE A | 999 | 1000 | 1001 | 1002 | 1003 | 1004 | 1005 | 1006 | 1007 | 1008 |
| BEACON Rx BY DEVICE B | 999 | 1000 | 1001 | 1002 | 1003 | 1004 | 1005 | 1006 | 1007 | 1008 |
| BEACON Rx BY DEVICE C | 999 | 1000 | 1001 | 1002 | 1003 | 1004 | 1005 | 1006 | 1007 | 1008 |
| BEACON Rx BY DEVICE D | 999 | 1000 | 1001 | 1002 | 1003 | 1004 | 1005 | 1006 | 1007 | 1008 |

FIG. 5B

Table 520:

| LINK ID | SOURCE: DESTINATION DEVICE ID | PACKET NUMBER 0 | PACKET NUMBER 1 | PACKET NUMBER 2 | PACKET NUMBER 3 | PACKET NUMBER 4 | PACKET NUMBER 5 | PACKET NUMBER 6 | PACKET NUMBER 7 | PACKET NUMBER 8 | PACKET NUMBER 9 |
|---|---|---|---|---|---|---|---|---|---|---|---|
| 1 | A:H | 905 | 915 | 925 | 935 | 945 | 955 | 965 | 975 | 985 | 995 |
| 2 | B:H | 999 | 1000 | 1001 | 1002 | 1003 | 1004 | 1005 | 1006 | 1007 | 1008 |
| 3 | C:H | 999 | 1000 | 1001 | 1002 | 1003 | 1004 | 1005 | 1006 | 1007 | 1008 |
| 4 | D:H | 999 | 1000 | 1001 | 1002 | 1003 | 1004 | 1005 | 1006 | 1007 | 1008 |
| 5 | B:A | 996 | 997 | 999 | 1000 | 1001 | 1002 | 1003 | 1005 | 1006 | 1007 |
| 6 | C:A | 989 | 991 | 993 | 995 | 997 | 999 | 1001 | 1003 | 1005 | 1007 |
| 7 | D:A | 895 | 905 | 915 | 925 | 935 | 945 | 955 | 965 | 975 | 985 |
| 8 | C:B | 996 | 997 | 999 | 1000 | 1001 | 1002 | 1004 | 1005 | 1006 | 1007 |
| 9 | D:B | 995 | 996 | 997 | 999 | 1000 | 1001 | 1002 | 1004 | 1005 | 1006 |
| 10 | D:C | 999 | 1000 | 1001 | 1002 | 1003 | 1004 | 1005 | 1006 | 1007 | 1008 |

530

| LINK ID | SOURCE DEVICE ID | DESTINATION DEVICE ID | MOTION INDICATOR VALUE | SIGNAL QUALITY METRIC | SEQUENCE RANGE | WEIGHTED MOTION INDICATOR VALUE |
|---|---|---|---|---|---|---|
| 1 | A | H | 100 | 10 | 995-995 | 0 |
| 2 | B | H | 10 | 100 | 999-1008 | 10 |
| 3 | C | H | 10 | 100 | 999-1008 | 10 |
| 4 | D | H | 10 | 100 | 999-1008 | 10 |
| 5 | B | A | 75 | 85 | 996-1007 | 75 |
| 6 | C | A | 50 | 50 | 989-1007 | 50 |
| 7 | D | A | 10 | 10 | 895-985 | 0 |
| 8 | C | B | 0 | 85 | 996-1007 | 0 |
| 9 | D | B | 0 | 85 | 995-1006 | 0 |
| 10 | D | C | 0 | 100 | 999-1008 | 0 |

| DEVICE ID | MOTION INDICATOR VALUE SUM | MIV PEAK TO AVERAGE RATIO | WEIGHTED MOTION INDICATOR VALUE SUM | WMIV PEAK TO AVERAGE RATIO |
|---|---|---|---|---|
| A | 100+75+50+0 = 225 | 225/104 = 2.163 | 0+75+50+0 = 125 | 125/62 = 2.016 |
| B | 10+75+0+0 = 85 | 85/104 = 0.817 | 10+75+0+0 = 85 | 85/62 = 1.371 |
| C | 10+50+0+0 = 60 | 60/104 = 0.577 | 10+50+0+0 = 60 | 60/62 = 0.968 |
| D | 10+10+0+0 = 20 | 20/104 = 0.192 | 10+0+0+0 = 10 | 10/62 = 0.161 |
| H | 100+10+10+10 = 130 | 130/104 = 1.250 | 0+10+10+10 = 30 | 30/62 = 0.484 |

FIG. 5D

MOTION LOCALIZATION IN A WIRELESS MESH NETWORK BASED ON MOTION INDICATOR VALUES

CROSS REFERENCE TO RELATED APPLICATION

This application is a continuation of U.S. patent application Ser. No. 15/789,761, filed Oct. 20, 2017, entitled "Motion Localization in a Wireless Mesh Network Based on Motion Indicator Values," the contents of which are incorporated herein by reference.

BACKGROUND

The present disclosure generally relates to motion detection and localization.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

BRIEF DESCRIPTION OF THE DRAWINGS

FIG. 1C illustrates example communication paths defining a communication link between wireless communication devices;

FIGS. 3A and 3B illustrate example signals communicated between wireless communication devices;

FIGS. 4A and 4B illustrate an example wireless communication system;

FIG. 5A is a table of example sequence values indicated by wireless signals transmitted and received in the wireless communication system of FIGS. 4A and 4B according to a scenario of one-hundred percent (100%) throughputs;

FIG. 5B is a table of example sequence values indicated by motion probe signals received in the wireless communication system of FIGS. 4A and 4B according to a scenario of various throughputs;

FIG. 5C is a table of example motion information for communication links in the wireless communication system of FIGS. 4A and 4B;

FIG. 5D is a table of example aggregate motion indicator values and confidence factors corresponding to wireless communication devices in the wireless communication network of FIGS. 4A and 4B.

DETAILED DESCRIPTION

In some aspects of what is described here, the location of detected motion in a space can be determined based on motion indicator values, time factors, or a combination thereof. For example, in some instances, the location of detected motion may be determined based on motion indicator values for respective wireless communication devices or links in a wireless communication system, such as a wireless mesh network. The motion indicator value for each individual wireless communication device may represent a degree of motion detected by the individual wireless communication device (generally, or on a specific communication link), and may be based on a subset of the wireless signals transmitted or received by that wireless communication device. The location of detected motion in the space can be a likelihood that the object is near one or more of the wireless communication devices that have the highest motion indicator values. The location can be determined by selecting the highest motion indicator value, or selecting the motion indicator values that are greater than a threshold.

As another example, in some instances, the location of detection motion may be determined based on time factors for respective wireless communication devices or links. The time factors may be, or may be based on: (i) range of sequence values included in the motion probe signals used to detect motion on that communication link, (ii) a set (e.g., all) of the sequence values included in the motion probe signals used to detect motion on that communication link, (iii) the minimum or maximum sequence value in the set of sequence values included in the motion probe signals used to detect motion on that communication link, or (iv) another indicator of a time period over which motion probe signals are obtained to detect motion. For example, the time factor may be a weighting factor that is based on the maximum or minimum sequence values in the set of motion probe signals used to detect motion by a device or on a particular communication link between devices. The weighting factor may be used to weight the motion indicator value for the device or link, and the weighted motion indicator value may be used to determine the location of the detected motion.

The systems and techniques described here may provide one or more advantages in some instances. For example, motion of an object may be detected based on wireless signals (e.g., radio frequency (RF) signals) received by a wireless communication device, without the need for clear line-of-sight. In addition, the location of the detected motion may be determined based on motion indicator values for each of multiple wireless communication devices, time factors, or both.

Figure 1A:
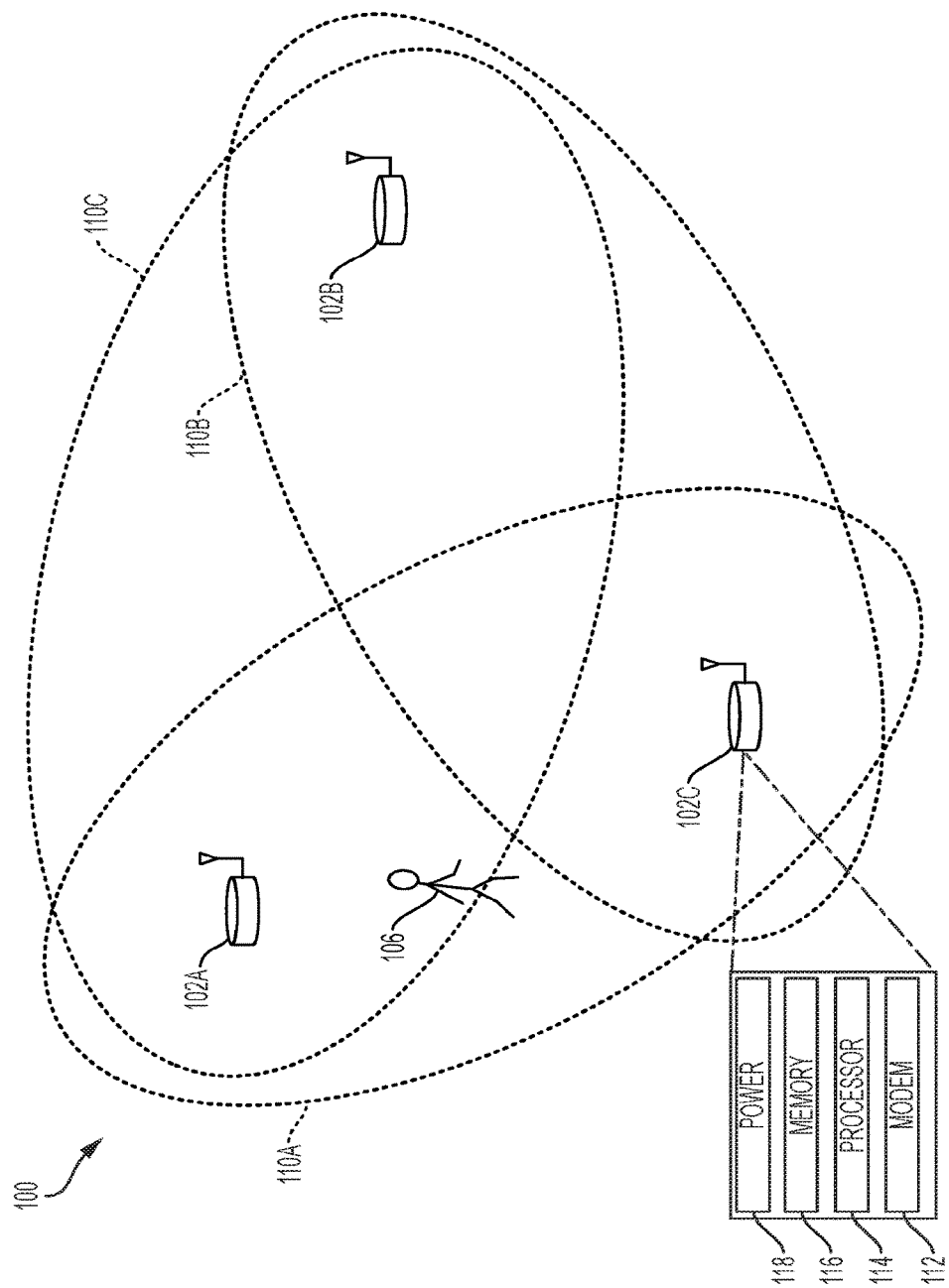
FIG. 1A illustrates an example wireless communication system.

FIG. 1A illustrates an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices and other components (e.g., additional wireless communication devices, one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In the example shown in FIG. 1A, the wireless communication devices 102A, 102B, 102C can be, or they may include, standard wireless network components. For example, the wireless communication devices 102A, 102B, 102C may be commercially-available Wi-Fi access points or another type of wireless access point (WAP) performing one or more operations as described herein that are embedded as instructions (e.g., software or firmware) on the modem of the WAP. In some cases, the wireless communication devices 102A, 102B, 102C may be nodes of a wireless mesh network, such as, for example, a commercially-available mesh network system (e.g., GOOGLE WIFI). In some cases, another type of standard or conventional Wi-Fi transmitter device may be used. The wireless communication devices 102A, 102B, 102C may be implemented without Wi-Fi components; for example, other types of standard or non-standard wireless communication may be used for motion detection. In some cases, the wireless communication devices 102A, 102B, 102C can be, or they may be part of, a dedicated motion detection system. For example, the dedicated motion detection system can include a hub device and one or more beacon devices (as remote sensor devices), and the wireless communication devices 102A, 102B, 102C can be either a hub device or a beacon device in the motion detection system.

As shown in FIG. 1A, the example wireless communication device 102C includes a modem 112, a processor 114, a memory 116, and a power unit 118; any of the wireless communication devices 102A, 102B, 102C in the wireless communication system 100 may include the same, additional or different components, and the components may be configured to operate as shown in FIG. 1A or in another manner. In some implementations, the modem 112, processor 114, memory 116, and power unit 118 of a wireless communication device are housed together in a common housing or other assembly. In some implementations, one or more of the components of a wireless communication device can be housed separately, for example, in a separate housing or other assembly.

Figure 1B:
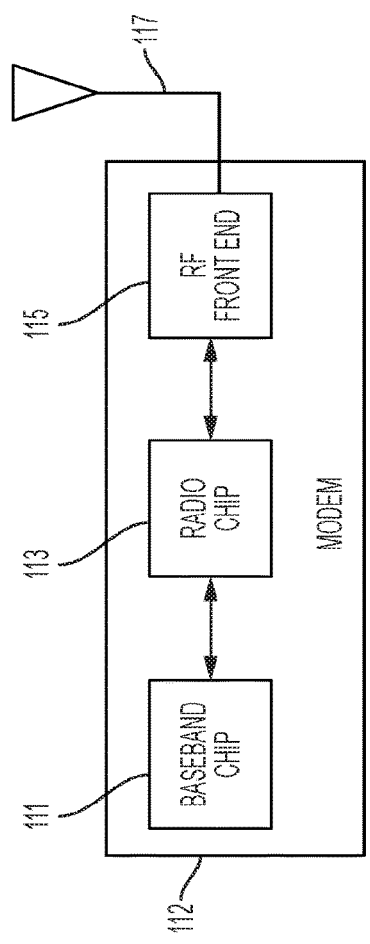
FIG. 1B illustrates an example modem of a motion detector device.

The example modem 112 can communicate (receive, transmit, or both) wireless signals. For example, the modem 112 may be configured to communicate radio frequency (RF) signals formatted according to a wireless communication standard (e.g., Wi-Fi or Bluetooth). The modem 112 may be implemented as the example wireless network modem 112 shown in FIG. 1B, or may be implemented in another manner, for example, with other types of components or subsystems. In some implementations, the example modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections. FIG. 1B illustrates an example modem 112 of a wireless communication device.

In some cases, a radio subsystem in the modem 112 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip 113, an RF front end 115, and one or more antennas 117, as illustrated in FIG. 1B. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in the modem 112 can include, for example, digital electronics configured to process digital baseband data. As an example, the baseband subsystem may include a baseband chip 111, as illustrated in FIG. 1B. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 112 receives baseband signals from the baseband subsystem, up-converts the baseband signals to radio frequency (RF) signals, and wirelessly transmits the radio frequency signals (e.g., through an antenna). In some instances, the radio subsystem in the example modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example modem 112 can communicate wireless network traffic (e.g., data packets) in the wireless communication network through the radio subsystem on one or more network traffic channels. The baseband subsystem of the modem 112 may also transmit or receive (or both) signals (e.g., motion probe signals or motion detection signals) through the radio subsystem on a dedicated wireless communication channel. In some instances, the baseband subsystem generates motion probe signals for transmission, for example, in order to probe a space for motion. In some instances, the baseband subsystem processes received motion detection signals (signals based on motion probe signals transmitted through the space), for example, to detect motion of an object in a space.

The example processor 114 can execute instructions, for example, to generate output data based on data inputs. The instructions can include programs, codes, scripts, or other types of data stored in memory. Additionally or alternatively, the instructions can be encoded as pre-programmed or re-programmable logic circuits, logic gates, or other types of hardware or firmware components. The processor 114 may be or include a general purpose microprocessor, as a specialized co-processor or another type of data processing apparatus. In some cases, the processor 114 performs high level operation of the wireless communication device 102C. For example, the processor 114 may be configured to execute or interpret software, scripts, programs, functions, executables, or other instructions stored in the memory 116. In some implementations, the processor 114 may be included in the modem 112.

The example memory 116 can include computer-readable storage media, for example, a volatile memory device, a non-volatile memory device, or both. The memory 116 can include one or more read-only memory devices, random-access memory devices, buffer memory devices, or a combination of these and other types of memory devices. In some instances, one or more components of the memory can be integrated or otherwise associated with another component of the wireless communication device 102C. The memory 116 may store instructions that are executable by the processor 114. For example, the instructions may include instructions for determining a location of detected motion, such as through one or more of the operations of the example process 600 of FIG. 6.

The example power unit 118 provides power to the other components of the wireless communication device 102C. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., an AC adapter) that receives an external power signal (from an external source) and coverts the external power signal to an internal power signal conditioned for a component of the wireless communication device 102C. The power unit 118 may include other components or operate in another manner.

In the example shown in FIG. 1A, the wireless communication devices 102A, 102B transmit wireless signals (e.g., according to a wireless network standard, a motion detection protocol, or otherwise). For instance, wireless communication devices 102A, 102B may broadcast wireless signals (e.g., reference signals, beacon signals, status signals, etc.), or they may send wireless signals addressed to other devices (e.g., a user equipment, a client device, a server, etc.), and the other devices (not shown) as well as the wireless communication device 102C may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In the example shown, the wireless communication device 102C processes the wireless signals from the wireless communication devices 102A, 102B to detect motion of an object in a space accessed by the wireless signals, to determine a location of the detected motion, or both. For example, the wireless communication device 102C may perform one or more operations of the example process 600 of FIG. 6, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the wireless communication device 102C can transmit wireless signals and the wireless communication devices 102A, 102B can processes the wireless signals from the wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, the third wireless communication device 102C may generate motion detection data. In some instances, the third wireless communication device 102C may communicate the motion detection data to another device or system, such as a security system, that may include a control center for monitoring movement within a space, such as a room, building, outdoor area, etc.

In some implementations, the wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by the third wireless communication device 102C, which may reduce the amount of processing that the third wireless communication device 102C performs for motion sensing. The header may include additional information such as, for example, an indication of whether motion was detected by another device in the communication system 100, an indication of the modulation type, an identification of the device transmitting the signal, etc.

In the example shown in FIG. 1A, the wireless communication system 100 is a wireless mesh network, with wireless communication links between each of the respective wireless communication devices 102. In the example shown, the wireless communication link between the third wireless communication device 102C and the first wireless communication device 102A can be used to probe a first motion detection field 110A, the wireless communication link between the third wireless communication device 102C and the second wireless communication device 102B can be used to probe a second motion detection field 110B, and the wireless communication link between the first wireless communication device 102A and the second wireless communication device 102B can be used to probe a third motion detection field 110C. In some instances, each wireless communication device 102 detects motion in the motion detection fields 110 accessed by that device by processing received signals that are based on wireless signals transmitted by the wireless communication devices 102 through the motion detection fields 110. For example, when the person 106 shown in FIG. 1A moves in the first motion detection field 110A and the third motion detection field 110C, the wireless communication devices 102 may detect the motion based on signals they received that are based on wireless signals transmitted through the respective motion detection fields 110. For instance, the first wireless communication device 102A can detect motion of the person in both motion detection fields 110A, 110C, the second wireless communication device 102B can detect motion of the person 106 in the motion detection field 110C, and the third wireless communication device 102C can detect motion of the person 106 in the motion detection field 110A.

In some instances, the motion detection fields 110 can include, for example, air, solid materials, liquids, or another medium through which wireless electromagnetic signals may propagate. In the example shown in FIG. 1A, the first motion detection field 110A provides a wireless communication channel between the first wireless communication device 102A and the third wireless communication device 102C, the second motion detection field 110B provides a wireless communication channel between the second wireless communication device 102B and the third wireless communication device 102C, and the third motion detection field 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement of an object in a space. The objects can be any type of static or moveable object, and can be living or inanimate. For example, the object can be a human (e.g., the person 106 shown in FIG. 1A), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of the wireless communication devices 102 (or another device communicably coupled to the devices 102) may determine that the detected motion is nearby a particular wireless communication device.

FIG. 1C illustrates example communication paths defining a communication link between the wireless communication devices 102A and 102C of FIG. 1A. In the example shown, the first wireless communication device 102A includes first modem 112A, and the third wireless communication device 102C includes third modem 112C. The example wireless modems 112A and 112C communicate with each other over multiple communication paths 121-124. The four communication paths 121-124 define a communication link 126 between the two wireless communication devices 102A and 102C. Each communication path is defined by a signal hardware path of the modem 112A and a signal hardware path of the modem 112C. For instance, in the example shown, the communication path 121 is defined by the antenna 128A of the modem 112A and the antenna 128C of the modem 112C, the communication path 122 is defined by the antenna 128A of the modem 112A and the antenna 130C of the modem 112C, the communication path 123 is defined by the antenna 130A of the modem 112A and the antenna 128C of the modem 112C, and the communication path 124 is defined by the antenna 130A of the modem 112A and the antenna 130C of the modem 112C. In some instances, the modems 112A and 112C may communicate over the various communication paths 121-124 by transmitting signals from both antennas 128, 130 (e.g., the same signal at each antenna), and the signals may be received by the other modem using one or both of the antennas 128, 130 (e.g., depending on interference in the respective communication paths). For instance, signals transmitted by antennas 128A, 130A may only be received at the antenna 128C of the modem 112C, where large amounts of interference is present near communication paths 122, 124. In some implementations, the signal hardware paths include multiple antennas of the modems. For instance, a communication path may be defined by multiple antennas at a first modem 112A and multiple antennas at a third modem 112C. More particularly, each communication path is between a transmitter (e.g., one or more transmit antennas) of a first wireless communication device of the pair and a receiver (e.g., one or more receive antennas) of a second wireless communication device of the pair. In certain implementations, a modem 112 includes two transmitters and two receivers, which provide four communication paths per modem. In other modem configurations, a different number of transmitters and receivers could be included, such as two transmitters and four receivers, which provide eight RF communication paths.

Figure 2:
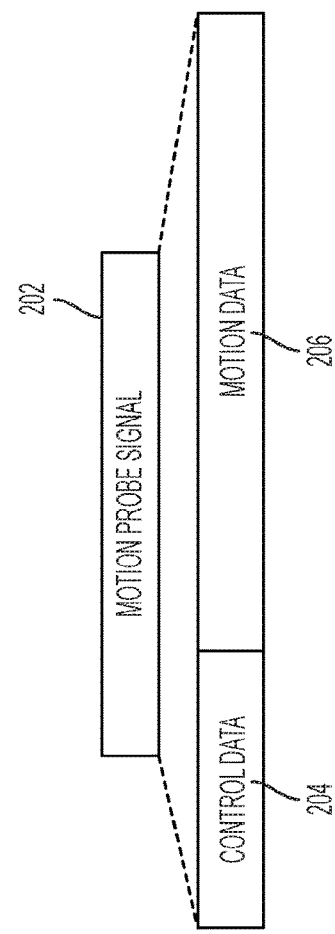
FIG. 2 illustrates an example motion probe signal.

FIG. 2 illustrates an example motion probe signal 202. The example motion probe signal 202 can be transmitted, for example, in a wireless communication system in order to monitor for motion in a space. In some examples, the motion probe signal 202 is transmitted in the form of a motion detection signal on a motion detection channel in a wireless communication network. In some example, the motion probe signal 202 includes a motion channel packet. For instance, the motion probe signal 202 can include binary data that is converted to an analog signal, up-converted to radio frequency, and wirelessly transmitted by an antenna.

The motion probe signal 202 shown in FIG. 2 includes control data 204 and a motion data 206. A motion probe signal 202 may include additional or different features, and may be formatted in another manner. In the example shown, the control data 204 may include the type of control data that would be included in a conventional data packet. For instance, the control data 204 may include a preamble (also called a header) indicating the type of information contained in the motion probe signal 202, an identifier of a wireless device transmitting the motion probe signal 202, a MAC address of a wireless device transmitting the motion probe signal 202, a transmission power, etc. The motion data 206 is the payload of the motion probe signal 202. In some implementations, the motion data 206 can be or include, for example, a pseudorandom code or another type of reference signal. In some implementations, the motion data 206 can be or include, for example, a beacon signal broadcast by a wireless network system.

In an example, the motion probe signal 202 is transmitted by a wireless device (e.g., the wireless communication device 102A shown in FIG. 1A) and received at a motion detection device (e.g., the motion detector device 102C shown in FIG. 1A). In some cases, the control data 204 changes with each transmission, for example, to indicate the time of transmission or updated parameters. The motion data 206 can remain unchanged in each transmission of the motion probe signal 202. The motion detection device can process the received signals based on each transmission of the motion probe signal 202, and analyze the motion data 206 for changes. For instance, changes in the motion data 206 may indicate movement of an object in a space accessed by the wireless transmission of the motion probe signal 202. The motion data 206 can then be processed, for example, to generate a response to the detected motion.

FIGS. 3A and 3B illustrate example signals communicated between wireless communication devices. As shown in FIGS. 3A and 3B, multiple example paths of the wireless signals transmitted from the first wireless communication device 304A are illustrated by dashed lines. Along a first signal path 316, the wireless signal is transmitted from the first wireless communication device 304A and reflected off the first wall 302A toward the second wireless communication device 304B. Along a second signal path 318, the wireless signal is transmitted from the first wireless communication device 304A and reflected off the second wall 302B and the first wall 302A toward the third wireless communication device 304C. Along a third signal path 320, the wireless signal is transmitted from the first wireless communication device 304A and reflected off the second wall 302B toward the third wireless communication device 304C. Along a fourth signal path 322, the wireless signal is transmitted from the first wireless communication device 304A and reflected off the third wall 202C toward the second wireless communication device 304B.

In FIG. 3A, along a fifth signal path 324A, the wireless signal is transmitted from the first wireless communication device 304A and reflected off the object at the first position 314A toward the third wireless communication device 304C. Between FIGS. 3A and 3B, a surface of the object moves from the first position 314A to a second position 314B in the space 300 (e.g., some distance away from the first position 314A). In FIG. 3B, along a sixth signal path 324B, the wireless signal is transmitted from the first wireless communication device 304A and reflected off the object at the second position 314B toward the third wireless communication device 304C. The sixth signal path 324B depicted in FIG. 3B is longer than the fifth signal path 324A depicted in FIG. 3A due to the movement of the object from the first position 314A to the second position 314B. In some examples, a signal path can be added, removed, or otherwise modified due to movement of an object in a space.

In the example shown in FIGS. 3A and 3B, the first wireless communication device 304A can repeatedly transmit a wireless signal. In particular, FIG. 3A shows the wireless signal being transmitted from the first wireless communication device 304A at a first time, and FIG. 3B shows the same wireless signal being transmitted from the first wireless communication device 304A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless communication device 304A in an omni-directional manner, in a directional manner or otherwise. In the example shown, the wireless signals traverse multiple respective paths in the space 300, and the signal along each path may become attenuated due to path losses, scattering, reflection, or the like and may have a phase or frequency offset.

As shown in FIGS. 3A and 3B, the signals from various paths 316, 318, 320, 322, 324A, and 324B combine at the third wireless communication device 304C and the second wireless communication device 304B to form received signals. Because of the effects of the multiple paths in the space 300 on the transmitted signal, the space 300 may be represented as a transfer function (e.g., a filter) in which the transmitted signal is input and the received signal is output. When an object moves in the space 300, the attenuation or phase offset affected upon a signal in a signal path can change, and hence, the transfer function of the space 300 can change. Assuming the same wireless signal is transmitted from the first wireless communication device 304A, if the transfer function of the space 300 changes, the output of that transfer function—the received signal—will also change. A change in the received signal can be used to detect movement of an object.

Mathematically, a transmitted signal f(t) transmitted from the first wireless communication device 304A may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 304A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \tag{3}$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \tag{4}$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n = \sum_k c_n \alpha_{n,k} e^{j\phi_{n,k}}. \tag{5}$$

The complex value $H_n$ for a given frequency component $\omega_n$ indicates a relative magnitude and phase offset of the received signal at that frequency component $\omega_n$. When an object moves in the space, the complex value $H_n$ changes due to the channel response $\alpha_{n,k}$ of the space changing. Accordingly, a change detected in the channel response can be indicative of movement of an object within the communication channel. In some instances, noise, interference or other phenomena can influence the channel response detected by the receiver, and the motion detection system can reduce or isolate such influences to improve the accuracy and quality of motion detection capabilities.

In some implementations, the channel response can be represented as:

$$h_{ch} = \sum_k \sum_{n=-\infty}^{\infty} \alpha_{n,k}. \tag{6}$$

In some instances, the channel response $h_{ch}$ for a space can be determined, for example, based on the mathematical theory of estimation. For instance, a reference signal $R_{ef}$ can be modified with candidate channel responses ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the candidate channel responses ($h_{ch}$), and then the channel coefficients of the channel response ($h_{ch}$) are varied to minimize the squared error of the estimated received signal ($\hat{R}_{cvd}$). This can be mathematically illustrated as:

$$\hat{R}_{cvd} = R_{ef} \otimes h_{ch} = \sum_{k=-m}^{m} R_{ef}(n-k) h_{ch}(k) \tag{7}$$

with the optimization criterion $$\min_{h_{ch}} \sum (\hat{R}_{cvd} - R_{cvd})^2. \tag{8}$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like.

As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient. In some instances, the channel response $h_{ch}$ for a space can be determined based on channel state information (CSI) determined by the modem or other component of the wireless communication device receiving the wireless signals.

In some aspects, a signal quality metric may be determined for received signals based on the channel response. For example, a determined channel response ($h_{ch}$) for a space may be applied to a reference signal ($R_{ef}$) to yield an estimated received signal ($\hat{R}_{cvd}$), which is an estimation of what the received signal should be based on the channel response (e.g., based on convolution of the reference signal ($R_{ef}$) with the channel response ($h_{ch}$) as described above). The estimated received signal ($\hat{R}_{cvd}$) and the actual received signal ($R_{cvd}$) may be used to compute a signal quality metric. In some examples, for instance, the signal quality metric is based on (e.g., is set equal to, is computed from, is representative of, etc.) a value Q that is determined by computing the dot product of the actual received signal ($R_{cvd}$) and the difference between the estimated received signal ($\hat{R}_{cvd}$) and the actual received signal ($R_{cvd}$), e.g.:

$$Q = R_{cvd} \cdot (\hat{R}_{cvd} - R_{cvd}). \tag{9}$$

In some cases, received signals may be "rejected" by a wireless communication device. For example, in some implementations, a motion detection process may include quality criterion for signals. Received signals that do not meet the quality criterion may be rejected (e.g., discarded or ignored) and not considered in determining whether motion has occurred in the space 300. The signals may be accepted or rejected as inputs to the motion detection process based on the signal quality metric (e.g., the value Q described by Equation (9)). For instance, in some cases, motion is detected using only a subset of received signals that have values Q above a certain threshold.

FIGS. 4A and 4B illustrate an example wireless communication system 400. In the example shown, the example wireless communication system 400 is a wireless mesh network that includes multiple remote sensor devices 402A, 402B, 402C, 402D, and a hub device 404, and each device can communicate wirelessly with one or more of the other devices in the system 400. In some instances, the wireless communication system 400 can be used within the wireless communication system 100 of FIG. 1A. The remote sensor devices 402 and hub device 404 in FIGS. 4A and 4B can be implemented in the same or similar manner as the wireless communication devices 102A, 102B, and 102C of FIG. 1A, or the wireless communication devices 302 of FIGS. 3A and 3B. Arrangements other than that shown in FIGS. 4A and 4B are possible. In some implementations, any one of the remote sensor devices 402 can be configured to perform operations of the hub device 404. In some instances, only one device 402 or 404 performs operations of the hub device 404 described herein.

In the examples shown in FIGS. 4A and 4B, a beacon wireless signal 406 is transmitted by the hub device 404 (as shown in FIG. 4A), and in response to receiving the beacon wireless signal 406, each of the remote sensor devices 402 transmits a motion probe signal (the motion probe signals 408, 410, 412, 414 as shown in FIG. 4B). When an object 416 (e.g., person) moves within the space accessed by the motion probe signals, as shown in FIG. 4B, a signal path of the motion probe signals can be added, removed, or otherwise modified due to the movement as described above. For example, the motion probe signals 408, 410, 412, 414 shown in FIG. 4B may experience attenuation, frequency shifts, phase shifts, or other effects through their respective paths and may have portions that propagate in another direction based on interactions with the moving object. The remote sensor devices 402 and/or the hub device 404 can monitor for these changes (e.g., by analyzing the channel response as described above) to detect the motion of the object 416 in the space, and the hub device 404 can detect a relative location of the object 416 in the space (e.g., based on motion indicator values for the remote sensor devices 402 and/or the hub device 404, as described below).

As shown in FIG. 4A, the hub device 404 transmits an example beacon wireless signal 406 in an omnidirectional manner. The beacon wireless signal 406 can be transmitted in another manner (e.g., in another beam pattern, such as a non-omnidirectional pattern). For example, the hub 404 can broadcast the beacon wireless signal 406. The propagation of the beacon wireless signal 406 across distances is illustrated by dashed-line, concentric circles. The remote sensor devices 402 receive the beacon wireless signal 406 and perform one or more operations based on the received beacon wireless signal 406. In some instances, the hub 404 transmits beacons sequentially, namely, transmitting the beacon wireless signal 406 at a first time, and transmitting a subsequent beacon wireless signal a second, later time. The beacon wireless signals 406 transmitted by the hub device 404 may form a series of wireless signals. The hub device 404 can transmit beacon wireless signals 406 continuously, periodically, at random or intermittent times or the like, or a combination thereof. In certain implementations, for example, the hub device 404 repeatedly transmits the beacon wireless signal 406. In certain implementations, the beacon wireless signal 406 indicates an instruction to the remote sensor devices 402 to transmit a motion probe signal.

In some implementations, the beacon wireless signal 406 includes synchronization information that controls a timing of when the remote sensor devices transmit the motion probe signals 408, 410, 412, 414. For example, the synchronization information can indicate an instruction to the remote sensor devices 402 to simultaneously transmit the motion probe signals 408, 410, 412, 414 at a specified point in time. As another example, the synchronization information can indicate an instruction to the remote sensor devices to transmit the motion probe signals 408, 410, 412, 414 at specified intervals after receiving the beacon wireless signal 406.

In some implementations, the beacon wireless signal 406 includes a sequence value. For example, the hub device 404 can configure the header (e.g., control data) of the beacon wireless signal 406 to include the sequence value. The header of the beacon wireless signal 406 may also include an identification of the transmitting remote sensor device 402. The hub device 404 may send subsequent beacon wireless signals 406 with incremented or decremented sequence values. To obtain each sequence value, the hub device 404 can sequentially select a different value from a set of values, or the hub 404 can generate different values in a sequential order. For example, a beacon wireless signal transmitted by the hub device 404 at a first time ($t_0$) can include sequence value 999; and at a second, later time ($t_1$), the hub device 404 can transmit a beacon wireless signal that includes the next sequence value 1000, and so forth, as shown in FIG. 5A. In some instances, the sequence value represents a time position of the wireless signal within the series of beacon wireless signals 406. The sequence values may be selected and modified in subsequent transmissions in another manner.

FIG. 4B illustrates example wireless motion probe signals transmitted in the wireless communication system 400 of FIG. 4A. In the example shown, each remote sensor device 402 transmits a motion probe signal in response to receiving a beacon wireless signal 406 (e.g., from the hub device 404, as shown in FIG. 4A). More particularly, in response to receiving the beacon wireless signal 406, the remote sensor device 402A transmits a first motion probe signal 408, the remote sensor device 402B transmits a second motion probe signal 410, the remote sensor device transmits a third motion probe signal 412, and the remote sensor device 402D transmits a fourth motion probe signal 414. In the example shown, the remote sensor devices 402 transmit the respective motion probe signals 408, 410, 412, 414 in a directional manner. The propagation of the motion probe signals 408, 410, 412, 414 across distances is illustrated in FIG. 4B by dashed-line, concentric circular arcs. The remote sensor devices may transmit the motion probe signals in another manner (e.g., in another beam pattern, such as a non-omnidirectional pattern). In some instances, the hub device 404 transmits motion probe signals in the same manner as the remote sensor devices 402.

In the example shown in FIGS. 4A and 4B, the remote sensor device 402A receives the beacon wireless signal 406, and in response, performs one or more operations based on the received signal, such as, for example, updating an internal sequence value. For instance, the remote sensor device 402A may be configured to store an internal sequence value, and update the internal sequence value with the sequence value obtained from the most recently received beacon wireless signal 406. The remote sensor device 402A transmits the first motion probe signal 408 with a sequence value (e.g., in a header) that is the same as the stored internal sequence value. The remote sensor device 402A may also transmit the first motion probe signal 408 with an identifier indicating that the device 402A sent the signal 408. The other remote sensor devices 402B-402D and the hub device 404 can then receive signals based on the first motion probe signal 408 and perform one or more operations thereafter (e.g., detect motion, transmit motion information, or other operations). The other remote sensor devices 402B-402D may operate in the same or similar manner as described above with respect to the remote sensor device 402A, or in another manner.

The remote sensor devices 402 and the hub device 404 can detect motion of the object 416 based on the motion probe signals transmitted by the remote sensor devices. For example, the remote sensor devices may analyze changes in the channel response (e.g., as described above) to detect whether motion has occurred in the space accessed by the motion probe signals. In some instances, a specified number of signals (a "motion calculation quantity") is used to detect whether motion has occurred. If motion is detected in the space, then a motion indicator value (MIV) is computed by the device. The MIV represents a degree of motion detected by the device based on the wireless signals transmitted or received by the device. For instance, higher MIVs can indicate a high level of channel perturbation (due to the motion detected), while lower MIVs can indicate lower levels of channel perturbation. Higher levels of channel perturbation may indicate motion in close proximity to the device. The MIVs may include aggregate MIVs (representing a degree of motion detected in the aggregate by the respective device 402), link MIVs (representing a degree of motion detected on particular communication links between respective devices 402), path MIVs (representing a degree of motion detected on particular communication paths between hardware signal paths of respective devices 402), or a combination thereof. Example MIVs are discussed below with respect to FIGS. 5C-5D.

Figure 6:
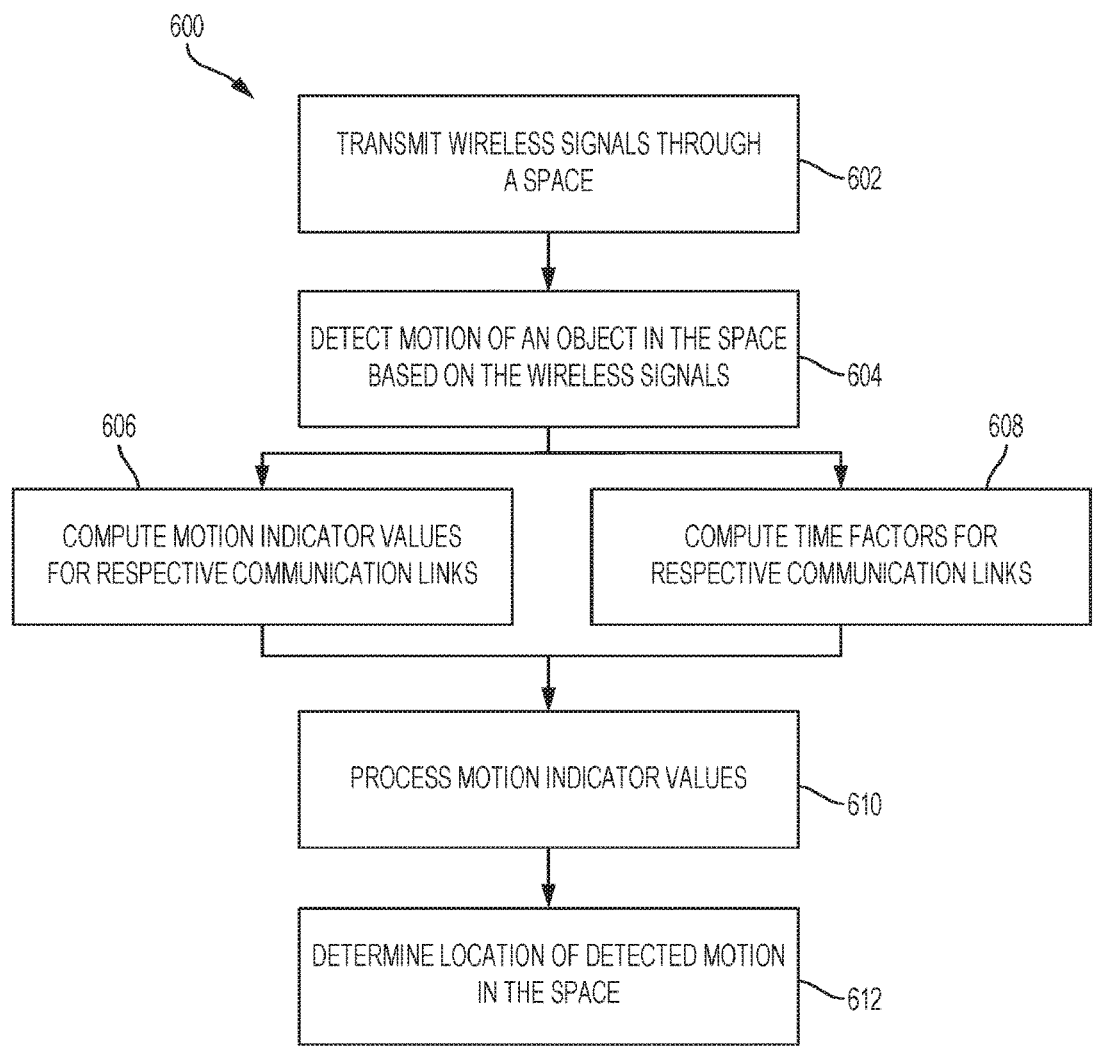
FIG. 6 illustrates a process of determining a location of detected motion in a space.

The hub device 404 can then determine a relative location of the detected motion of the object 416 based on the MIVs (e.g., by performing one or more of the operations of the example process 600 of FIG. 6). In some implementations, for instance, the remote sensor devices 402 transmit (e.g., periodically or after motion has been detected) motion information to the hub device 404 that includes the MIVs computed by the respective remote sensor devices 402. The motion information may also include, in some instances, other information related to the motion detection performed by the respective remote sensor devices 402. For example, the motion information may include signal quality metric values (e.g., for the device in the aggregate or for respective links between the device and other devices), sequence values of the signals used to detect the motion, or other information used by the devices 402 to detect motion. The hub device 404 then uses the motion information from the remote sensor devices 402 and its own motion information (since the hub device 404 also detects motion based on the motion probe signals) to determine the location of the detected motion (e.g., the location of the object 416). In some instances, the hub device 404 may weight one or more of the data in the motion information (e.g., the MIVs) before using the data to determine the location of the detected motion.

In some implementations, the detection of motion, the determination of the location of the detected motion, or both can be performed by another device. For example, in some instances, a remote server communicably coupled to the wireless communication system 400 may receive the motion information from the devices 402, 404 (instead of the hub device 404 as described above) and may determine a location of the detected motion based on the motion information.

FIG. 5A is a table 510 of example sequence values indicated by wireless signals transmitted and received in the wireless communication system 400 of FIGS. 4A and 4B according to a scenario of one-hundred percent (100%) throughputs. In the example shown, the hub device 404 transmits ten (10) consecutive beacon wireless signals (Beacon No. 0 through Beacon No. 9), each at one of ten (10) consecutive points in time, from a first time ($t_0$) through a tenth time ($t_9$). The hub device 404 configures each of the ten (10) consecutive beacon wireless signals (Beacon No. 0 through Beacon No. 9) to include a respective sequence value obtained from a set of values {999, 1000, . . . , 1007, 1008}. In the example shown, the sequential order of sequence values is incremented by an integer value of one (1); however, the sequence values can be incremented, decremented, or otherwise changed in another manner, such as, for example, by being incremented or decremented by an integer of two (2). In some instances, the sequence values include alphabetical characters, and the sequence values are incremented alphabetically (e.g., A through Z, AA through ZZ, and so forth).

The ten (10) consecutive beacon wireless signals (Beacon No. 0 through Beacon No. 9) are received by each remote sensor device 402, and each remote sensor device 402 transmits a motion probe signal in response. More particularly, the remote sensor devices 402 configure and transmit ten (10) consecutive motion probe signals (e.g., motion probe signals 408, 410, 4121, 414) that include a respective sequence value {999, 1000, . . . , 1007, 1008} received via the ten (10) consecutive beacon wireless signals.

FIG. 5B is a table 520 of example sequence values indicated by motion probe signals received in the wireless communication system 400 of FIGS. 4A and 4B according to a scenario of various throughputs. More particularly, the table 520 shows the ten (10 most recently-received sequence values in motion probe signals on the respective communication links. As in the previous example, the hub device 404 configures each consecutive beacon wireless signal with a sequential sequence value incremented by an integer value of one (1). When interference is present or a link between devices is otherwise poor (e.g., large distance between the devices), only certain beacon wireless signals are received by the remote sensor devices. Thus, only those certain sequence values received by the remote sensor devices are transmitted out in motion probe signals, and, as shown in FIG. 5B, the motion probe signals received on the various communication links will have varying ranges of sequence values. These sequence values can indicate a link signal quality, and may be used, for example, to weight the MIV for the respective link. For example, where the link has a large range of sequence values or older sequence values relative to the other links (e.g., like Link IDs 1 and 7 in FIG. 5B), the signal quality may be poor and the data used to detect motion may be old (relative to the other links). Thus, motion detected on these links (the MIVs for the link) may be weighted down or not considered when determining a location of detected motion.

In the table 520, the identification of each communication link corresponds to device identifications of the source and destination devices that communicate via that communication link. The remote sensor devices 402A, 402B, 402C, 402D and the hub device 404 have respective device IDs A, B, C, D, and H. In the example shown, the first communication link (Link ID 1) corresponds to source device ID A, and destination device ID H. The second communication link (Link ID 2) corresponds to source device ID B, and destination device ID H. The third communication link (Link ID 3) corresponds to source device ID C, and destination device ID H. The fourth communication link (Link ID 4) corresponds to source device ID D, and destination device ID H. The fifth communication link (Link ID 5) corresponds to source device ID B, and destination device ID A. The sixth communication link (Link ID 6) corresponds to source device ID C, and destination device ID A. The seventh communication link (Link ID 7) corresponds to source device ID D, and destination device ID A. The eighth communication link (Link ID 8) corresponds to source device ID C, and destination device ID B. The ninth communication link (Link ID 9) corresponds to source device ID D, and destination device ID B. The tenth communication link (Link ID 10) corresponds to source device ID D, and destination device ID C. In the example shown, the reciprocal links between devices (e.g., the reciprocal link for Link ID 10, where the source is device ID C and the destination is device ID D) are not shown to avoid redundancy.

FIG. 5C is a table 530 of example motion information for communication links in the wireless communication system 400 of FIGS. 4A and 4B. In the example shown, the table 530 includes link MIVs that correspond to respective communication links and indicate an amount of channel perturbation from the detected motion between the source and destination devices of the communication link. A higher MIV indicates more channel perturbation between source and destination devices of a communication link, and a lower motion value indicates less channel perturbation between the pair of source and destination devices. The example MIVs in the table 530 are normalized between zero (0) to one hundred (100). The table 530 also includes signal quality metric values for the respective communication links, and a range of sequence values of the motion probe signals used to detect motion (e.g., the data used to generate the MIV shown in the table 530). Although illustrated as including motion information for respective communication links, the table 530 may, in some implementations, include motion information for respective communication paths between the various devices.

The signal quality metric values in the table 530 indicate a relative quality of communications on each respective communication link. The signal quality metric value can be based on multiple factors, including a throughput between the pair of wireless communication devices corresponding to the communication link (as indicated by the sequence range for the communication link in the table 530), a signal to noise ratio (SNR), a number of dropped packets, or a combination thereof. In the example shown, the signal quality metric is computed to be within a range of zero (0) to one hundred (100). In some instances, the signal quality metric is based on (e.g., equal to) the value Q described above in Equation (9). A higher signal quality metric indicates a higher quality channel environment of the communication link. For instance, in the example shown, Link IDs 1 and 7 both have relatively low signal quality metric values of ten (10) based at least in part on the low throughput of these communication links.

The sequence range in the table 530 indicate a time period over which motion is detected per communication link. As an example, the motion probe signals used to detect motion on Link ID 1 are collected over a longer period of time based on a larger span of the sequence range from 905-995 compared to the shorter sequence range from 999-1008 for Link ID 2. In some instances, motion is detected using a specified number of data packets, so a larger sequence range indicate a longer period of time needed to gather the specified number of packets for motion detection. With poor links (such as Link ID 1), it may take longer to collect the specified number of packets, and thus, the motion detection may be more unreliable as compared to a link (such as Link ID 2) whose data packets were more recently received. Thus, in some instances, the MIVs may be weighted based on the sequence range associated with the MIV. A corresponding weighted MIV can be generated by scaling an unweighted MIV by the determined weight.

The hub device 404 can determine a weight based on a time factor (e.g., such as the sequence range), a signal quality metric value, or another factor. For example, the hub device 404 can select the maximum sequence value in the Sequence Range column as a temporal reference value (also referred to as "reference sequence value") and weight the MIV based on the reference sequence value. In the example shown, the hub device 404 selects a value of 1008 as the reference sequence value, since that is the most recently-received sequence value. The hub 404 can generate a weight based on the reference sequence value in various ways. For instance, in the example shown, a binary weighting (e.g., weighting values of zero (0) or one (1) are used) is applied based on whether the maximum sequence value for the communication link is within a threshold sequence range of the reference sequence value. Thus, in the example shown, the MIVs for Link IDs 1 and 7 are weighted to zero (0) because their maximum sequence value is not within 10 of the reference sequence value of 1008. Another weighting technique can be implemented instead of the binary technique shown. For instance, a gradual weighting method that applies a weighting factor between zero (0) and one (1) can be used. In some instances, for example, a communication link that has a maximum sequence value (e.g., 900) far off (e.g., outside a threshold sequence range) from the reference sequence value (1008 in the example shown) can contribute some portion of its MIV to the location determination, such as by applying a weight that is greater than zero.

In some implementations, a neural network is trained to determine the location of detected motion based on information provided by the hub device 404. For instance, the hub device 404 can provide the information in the table 530 as an input to a trained neural network, and the neural network can provide a determination of the location of the detected motion. The neural network can be configured to generate a weighting function through a machine-learning process, wherein input data to the neural network includes a range of sequence values and corresponding motion values.

FIG. 5D is a table 540 of example aggregate motion indicator values and confidence factors corresponding to wireless communication devices in the wireless communication network 400 of FIGS. 4A and 4B. In particular, the table 540 includes confidence factors that are Peak to Average Ratios of the MIVs (with or without weighting applied). The aggregate MIVs are based on the link MIVs shown in the table 530. In some instances, the aggregate MIVs can be computed according to the following equation:

$$\text{motion(device)} = \sum_{links} \text{motion(link)}[\text{link}_{source} = \text{device} \mid \text{link}_{dest} = \text{device}] \quad (10)$$

For instance, in the example shown for Link ID 1, the motion indicator value (motion(link)) indicates a degree of motion detected between the remote sensor device 402A ($\text{link}_{source}$) and the hub device 404 ($\text{link}_{dest}$) A higher aggregate MIV for a device may indicate that the detected motion is near that device, while a lower aggregate MIV may indicate that the detected motion is further away from the device. The hub device 404 can then compare the aggregate MIVs for the respective devices to determine a location of detected motion. For instance, in the example shown, the hub device 404 can determine that the detected motion is nearest to device ID A since that devices has the highest aggregate MIV (in both the weighted and non-weighted cases). In some instances, the weighted MIVs may be used to determine the location of the detected motion. In some implementations, the hub device 404 determines a peak to average ratio of the aggregate MIVs (weighted or unweighted). The peak to average ratio can be used as a confidence factor, which can be represented as:

$$\text{peak}_{ratio}(\text{device}) = \frac{\text{motion(device)}}{\text{motion}_{average}} \quad (11)$$

The confidence factor can then be used to determine the location of the detected motion. For instance, in the example shown, the hub device 404 can determine that the detected motion is nearest device ID A since it is the device with the highest confidence factor (peak to average ratio; in both the weighted and unweighted cases). In some cases, such as where the number of users is less than the number of remote sensor devices 402, the hub device 404 can extend the confidence factor to determine that there is motion at the corresponding devices. For example, if the wireless communication system 400 includes 5 total devices and 1 user, then the wireless communication device that has the highest peak to average ratio that is above a threshold peak to average ratio value would indicate the likelihood that the user is near the wireless communication device that has the highest confidence factor. Similarly, if wireless communication system 400 includes 5 total devices and 2 users, then the top two confidence factors above a certain value may indicate the likelihood the users are near the two devices that have the two highest confidence factors.

In certain implementations, the hub device 404 can perform time averaged sampling over a period of time to smooth out the aggregate MIVs of communication links based on the signal quality metric values. In some instances, the motion information can be further aggregated into snapshots to indicate as a percentage which wireless communication device detected motion for various time periods. For a given period, the freshness of the motion information (e.g., how recently the motion probe signals were received, based on the sequence values) can be used to increment a counter for the determined location of the detected motion based on wireless communication device (e.g., device ID). If, during the sample period, the freshness of the data is below a threshold (e.g., the most recent sequence value is less than a particular reference value), then the counter is not incremented. Then, over a certain time period, the sum of each device's counter can be used (e.g., as a percentage) to determine the most active wireless communication device (the device closest to the detected motion) for the time period.

In some implementations, the location of the detected motion can be indicated on user equipment (e.g., smartphone, speaker) or an electronic display device (e.g., television, monitor, screen) to display or present the determined location of an object (i.e., person). The location of detected motion can be presented, for example, to a user in an interface (e.g., visual, audio, audiovisual display) highlighting the device 402 or 404 where motion was last determined to occur.

FIG. 6 illustrates a process 600 of determining a location of detected motion in a space. In some instances, the process 600 may be implemented to determine a location of detected motion based on motion indicator values for respective devices, communication links, communication paths, or a combination thereof. Operations in the example process 600 may be performed by a data processing apparatus (e.g., the processor 114 of the example wireless communication device 102C in FIG. 1A) to determine the location of the detected motion based on signals received at various wireless communication devices (e.g., the hub device 404 of FIGS. 4A and 4B may determine the location of the detected motion of the object 416 based on signals received at the remote sensor devices 402 and the hub device 404). The example process 600 may be performed by another type of device. For instance, operations of the process 600 may be performed by a system other than the wireless communication devices that receive the signals (e.g., a computer system connected to the wireless communication system 400 of FIGS. 4A and 4B that aggregates and analyzes motion indicator values).

The example process 600 may include additional or different operations, and the operations may be performed in the order shown or in another order. In some cases, one or more of the operations shown in FIG. 6 are implemented as processes that include multiple operations, sub-processes or other types of routines. In some cases, operations can be combined, performed in another order, performed in parallel, iterated, or otherwise repeated or performed another manner.

At 602, wireless signals are transmitted through a space. The wireless signals may be motion probe signals configured to probe the space for motion. The motion probe signals may be formatted similar to the motion probe signal 202 of FIG. 2, or in another manner. Referring to the example shown in FIGS. 4A and 4B, the remote sensor devices 402 transmit motion probe signals in response to beacon wireless signals transmitted by the hub device 404. In certain implementations, the beacon wireless signal includes a sequence value that indicates a point in time that the beacon wireless signal is transmitted, and the remote sensor devices include the sequence value in the motion probe signal (e.g., in the control data 204) transmitted in response to the beacon wireless signal.

At 604, motion is detected based on the wireless signals transmitted at 602. Motion may be detected at one or more of the wireless communication devices that receive the signals transmitted at 602. For instance, referring to the example shown in FIGS. 4A and 4B, each of the remote sensor devices 402 and the hub device 404 can execute a motion detection process to detect motion of the object 416. The motion detection process may detect motion of the object 416 based on the set of signals received by the respective wireless communication device at 602. In some instances, the motion detection process includes a comparison of signals received over a period of time. For example, motion may be detected based on a detected change in a frequency response of the signals received at 602, or based upon a detected change in the channel response for the space (e.g., based on channel state information (CSI)).

At 606, motion indicator values are computed for respective communication links. The motion indicator values may indicate a relative degree of motion detected on the communication link. For instance, referring to the example shown in FIG. 5C, the motion indicator values in the fourth column of the table 530 indicate a degree of motion detected by one or both of the devices indicated in the second and third columns on the respective communication link between those devices. The motion indicator values may be computed based on an amount of perturbation observed in the channel response for the communication link. In some instances, the motion indicator values are normalized. For example, the motion indicator values in the table 530 of FIG. 5C are values normalized between zero (0) and one hundred (100).

At 608, time factors are computed for respective communication links. The time factors for an individual communication link may be: (i) range of sequence values included in the motion probe signals used to detect motion on that communication link, (ii) a set (e.g., all) of the sequence values included in the motion probe signals used to detect motion on that communication link, (iii) the minimum or maximum sequence value in the set of sequence values included in the motion probe signals used to detect motion on that communication link, or (iv) another indicator of a time period over which motion probe signals are obtained to detect motion. In some implementations, the time factor for each communication link includes a value based on one or more of the aforementioned examples. For example, the time factor may be a weighting factor that is based on the maximum or minimum sequence values in the set of motion probe signals used to detect motion.

At 610, the motion indicator values are processed. The motion indicator values may be processed by a designated hub device (e.g., the hub device 404 in the example shown in FIGS. 4A and 4B), or by another system communicably coupled to the devices transmitting or sending motion probe signals. In certain implementations, processing the motion indicator values for the respective communication links includes computing an aggregate motion indicator value for the wireless communication devices. Computing the aggregate motion indicator values may include, in some instances, computing a sum of each link motion indicator value associated with the wireless communication device. For instance, referring to the example shown in FIGS. 5C-5D, the values in the second column of table 540 include sums of the link motion indicator values shown in table 530. The summed link motion indicator values may be used as the aggregate motion indicator values at 612 to determine a location of detected motion in some cases.

In certain implementations, computing the aggregate motion indicator values includes computing a peak to average ratio of the summed link motion indicator values for each wireless communication device. For instance, referring to the example shown in FIGS. 5C-5D, the values in the third column of table 540 include peak to average ratios for the summed link motion indicator values shown in table 530. The peak to average ratios may be used as the aggregate motion indicator values at 612 to determine a location of detected motion in some cases. In some instances, the peak to average ratios may be used as confidence factors as described above.

In some implementations, processing the motion indicator values for the respective communication links includes weighting (e.g., using a binary weighting, a gradual weighting, or a weighting scheme determined by a neural network) the link motion indicator values. In some instances, the weighting is based on the time factors computed at 608. For example. The same sum and peak to average values as described above can then be computed based on the weighted motion indicator values, and the computed values can be used as the aggregate motion indicator values at 612 to determine a location of detected motion.

At 612, a location of detected motion is determined. The location of the detected motion can be determined as a likelihood that the motion of an object is near one or more of the wireless communication devices. In some instances, the location is determined based on (i) the highest aggregate motion indicator value based on unweighted link motion indicator values; (ii) the highest aggregate motion indicator value based on weighted link motion indicator values; (iii) the highest confidence factor (e.g., peak to average ratio); or (iv) confidence factors that are greater than a threshold value. In some implementations, the determined location is with respect to one of the wireless communication devices. For instance, referring to the example shown in FIGS. 5C-5D, the determined location may be indicated with respect to Device ID A (e.g., "Detected motion near Device ID A") based on Device ID A having the highest sum of link motion indicator values or highest peak to average ratio of all the devices. In some implementations, the determined location is with respect to multiple wireless communication devices. For instance, referring to the example shown in FIGS. 5C-5D, the determined location may be indicated with respect to Device IDs A and B (e.g., "Detected motion near Device IDs A and B") based on those devices having peak to average ratios (in the weighted scenario) greater than one (1).

Although this disclosure is described with reference to motion values determined per communication link (e.g., communication link 126 in FIG. 1C), the process 600 of FIG. 6 can be implemented on a per communication path basis (e.g., the communication path 121-124 in FIG. 1C). In some instances, this may scale the number of inputs into the motion localization process described above. For example, in some implementations, the motion indicator values are computed for respective communication paths. For instance, assuming that each device indicated in the table 530 of FIG. 5C has two transmit and two receive antennas, motion indicator values may be computed for each of the four communication paths between the respective antennas of the devices. In some cases, the motion indicator values for the communication link may be based on the motion indicator values for the respective communication paths of the link. In some instances, the motion indicator values for the respective communication paths can be weighted based on a signal quality metric value for the communication path, and the weighted values for the communication paths can be used to determine the motion indicator values for the communication link. In some cases, the motion indicator values for the communication paths can be used in the same manner as described herein with respect to the use of motion indicator values for the communication links (e.g., the path motion indicator values may be used at 610 to compute the aggregate motion indicator values for the communication devices instead of the link motion indicator values). Time factors may also be computed for each respective communication path in the same manner as described above for the communication links. In some instances, the time factors may be used to compute the time factors for the respective communication links, or may be used in lieu of the time factors for the respective communication links (e.g., the path time factors may be used at 610 instead of the link time factors).

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer system can include a processor that performs actions in accordance with instructions, and one or more memory devices that store the instructions and data. A computer system may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer system need not have such devices. Moreover, a computer system can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of some of the examples described, a location of detected motion in a space is determined.

In a first example, motion of an object in a space is detected based on wireless signals communicated through the space by a wireless communication system comprising multiple wireless communication devices. Each wireless signal is transmitted and received by a respective pair of the wireless communication devices. Motion indicator values are computed, by operation of one or more processors, for the respective wireless communication devices. The motion indicator value for each individual wireless communication device represents a degree of motion detected by the individual wireless communication device based on a subset of the wireless signals transmitted or received by the individual wireless communication device. A location of the detected motion in the space is determined based on the motion indicator values.

Implementations of the first example may, in some cases, include one or more of the following features. The wireless communication system may include a hub device and remote sensor devices, and the hub device may receive motion indicator values from the remote sensor devices and determine the location of the detected motion based on the received motion indicator values. The motion indicator values may be aggregate motion indicator values. Link motion indicator values are obtained for respective communication links in the wireless communication system, and the aggregate motion indicator value for each wireless communication device is computed based on the link motion indicator values for the subset of the communication links supported by the wireless communication device. Each communication link may be provided by a respective pair of the wireless communication devices. Computing the aggregate motion indicator value for a wireless communication device may include weighting the link motion indicator values for the subset of communication links based on signal quality metrics for the respective communication links. The wireless communication system may include a plurality of communication links, where each communication link is provided by a respective pair of the wireless communication devices, and each communication link includes multiple communication paths, with each communication path being between a first signal hardware path of a first wireless communication device of the pair and a second signal hardware path of a second wireless communication device of the pair. Path motion indicator values for respective communication paths in the wireless communication system may be obtained, and the aggregate motion indicator value for each wireless communication device may be computed based on the path motion indicator values for the subset of the communication paths supported by the wireless communication device.

Implementations of the first example may, in some cases, include one or more of the following features. A confidence factor may be computed, for each wireless communication device based on scaling the motion indicator value for the wireless communication device by a normative motion indicator value for the wireless communication devices, wherein the location of the detected motion is determined based on the confidence factors. Determining the location of the detected motion in the space may include determining which of the wireless communication devices is nearest the detected motion based on comparing the respective motion indicator values for the wireless communication devices. The location of the detected motion in the space may be determined based on signal quality metrics for respective communication links in the wireless communication system, where each communication link provided by a respective pair of the wireless communication devices. Determining the location of the detected motion in the space may include combining signal quality metrics for the subset of communication links supported by each wireless communication device. The motion indicator values may be provided as inputs to a neural network, and the location of the detected motion may be determined based on an output of the neural network.

In a second example, motion of an object in a space is detected based on a series of wireless signals communicated through the space by a wireless communication system comprising multiple wireless communication devices. Time factors are computed, by operation of one or more processors, for each respective pair of the wireless communication devices based on sequence values included in respective wireless signals transmitted and received between the pair of the wireless communication devices. The sequence value in each wireless signal represents a time position of the wireless signal within the series. A location of the detected motion in the space is determined based on the time factors.

Implementations of the second example may, in some cases, include one or more of the following features. The wireless communication system may include a hub device and remote sensor devices. The hub device may receive motion indicator values from the remote sensor devices and determine the location of the detected motion based on the received motion indicator values and the time factors. Motion indicator values may be computed for the respective wireless communication devices of the wireless communication system, where the motion indicator value for each individual wireless communication device represents a degree of motion detected by the individual wireless communication device. The motion indicator value may be based on a subset of the series wireless signals that are transmitted or received by the individual wireless communication device. The location of the detected motion may be determined based on the motion indicator values and the time factors. Each motion indicator value may be weighted by an associated time factor, and the location of the detected motion may be determined based on the weighted motion indicator values. The associated time factor may be for a same wireless communication device as the motion indicator value.

Implementations of the second example may, in some cases, include one or more of the following features. Computing the time factors may include selecting a reference sequence value from among sequence values included in a set of the wireless signals received by the wireless communication devices of the wireless communication system, and computing the time factors for each communication link provided by each of the respective pairs of the wireless communication devices. The computing of the time factor for each communication link may be based on a determination of whether the sequence values in the wireless signals received on the communication link are within a threshold sequence range of the reference sequence value. The reference sequence value may be a maximum or minimum sequence value in the set of the wireless signals received by the wireless communication devices of the wireless communication system. Computing the time factor for each communication link may include determining whether a maximum sequence value included in a subset of the wireless signals received on the communication link is within a threshold sequence range of the reference sequence value. The sequence values may be provided as inputs to a neural network, and the time factors may be computed based on an output of the neural network.

In some implementations, a computer-readable storage medium stores instructions that are operable when executed by a data processing apparatus to perform one or more operations of the first or second example. In some implementations, a system (e.g., a wireless communication device, computer system or other type of system communicatively coupled to the wireless communication device) includes one or more data processing apparatuses and a memory storing instructions that are operable when executed by the data processing apparatus to perform one or more operations of the first or second example. In some implementations, a motion detection system includes a hub device and one or more remote sensor devices that are configured to perform one or more operations of the first or second example.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A motion detection method comprising:
   detecting motion of an object in a space, based on a series of wireless signals communicated through the space by a wireless communication system comprising multiple wireless communication devices, the wireless signals in the series being transmitted and received between respective pairs of the wireless communication devices and comprising sequence values based on beacon wireless signals from a hub device, wherein the sequence value represents a time position of the wireless signal within the series of wireless signals;
   by operation of one or more processors, computing time factors for each pair of the wireless communication devices based on the sequence values included in the wireless signals transmitted and received between the pair of the wireless communication devices;

by operation of one or more processors, computing weighted motion indicator values for each pair of the wireless communication devices based on the time factors; and determining a location of the detected motion in the space based on the weighted motion indicator values.

2. The method of claim 1, wherein the wireless communication system comprises the hub device and remote sensor devices, wherein the hub device receives motion indicator values from the remote sensor devices and determines the location of the detected motion based on the received motion indicator values and the time factors.

3. The method of claim 1, comprising:
computing motion indicator values for the respective wireless communication devices of the wireless communication system, the motion indicator value for each individual wireless communication device representing a degree of motion detected by the individual wireless communication device and being based on a subset of the series of wireless signals that are transmitted or received by the individual wireless communication device.

4. The method of claim 3, comprising:
weighting each motion indicator value by an associated time factor,
wherein the associated time factor is for a same wireless communication device as the motion indicator value.

5. The method of claim 1, wherein computing the time factors comprises:
selecting a reference sequence value from among sequence values included in a set of the wireless signals received by the wireless communication devices of the wireless communication system, and
computing the time factors for each communication link provided by each of the respective pairs of the wireless communication devices, wherein the computing of the time factor for each communication link is based on a determination of whether the sequence values in the wireless signals received on the communication link are within a threshold sequence range of the reference sequence value.

6. The method of claim 5, wherein the reference sequence value is a maximum or minimum sequence value in the set of the wireless signals received by the wireless communication devices of the wireless communication system.

7. The method of claim 5, wherein computing the time factor for each communication link comprises determining whether a maximum sequence value included in a subset of the wireless signals received on the communication link is within a threshold sequence range of the reference sequence value.

8. The method of claim 1, comprising:
providing the sequence values as inputs to a neural network; and
computing the time factors based on an output of the neural network.

9. A non-transitory computer-readable storage medium storing instructions that are operable when executed by data processing apparatus to perform operations comprising:
detecting motion of an object in a space, based on a series of wireless signals communicated through the space by a wireless communication system comprising multiple wireless communication devices, the wireless signals in the series being transmitted and received between respective pairs of the wireless communication devices and comprising sequence values based on beacon wireless signals from a hub device, wherein the sequence value represents a time position of the wireless signal within the series of wireless signals;

computing time factors for each pair of the wireless communication devices based on the sequence values included in the wireless signals transmitted and received between the pair of the wireless communication devices;

computing weighted motion indicator values for each pair of the wireless communication devices based on the time factors; and determining a location of the detected motion in the space based on the weighted motion indicator values.

10. The non-transitory computer-readable storage medium of claim 9, wherein the wireless communication system comprises the hub device and remote sensor devices, wherein the hub device receives motion indicator values from the remote sensor devices and determines the location of the detected motion based on the received motion indicator values and the time factors.

11. The non-transitory computer-readable storage medium of claim 9, wherein the operations comprise:
computing motion indicator values for the respective wireless communication devices of the wireless communication system, the motion indicator value for each individual wireless communication device representing a degree of motion detected by the individual wireless communication device and being based on a subset of the series of wireless signals that are transmitted or received by the individual wireless communication device.

12. The non-transitory computer-readable storage medium of claim 11, wherein the operations comprise:
weighting each motion indicator value by an associated time factor,
wherein the associated time factor is for a same wireless communication device as the motion indicator value.

13. The non-transitory computer-readable storage medium of claim 9, wherein computing the time factors comprises:
selecting a reference sequence value from among sequence values included in a set of the wireless signals received by the wireless communication devices of the wireless communication system, and
computing the time factors for each communication link provided by each of the respective pairs of the wireless communication devices, wherein the computing of the time factor for each communication link is based on a determination of whether the sequence values in the wireless signals received on the communication link are within a threshold sequence range of the reference sequence value.

14. The non-transitory computer-readable storage medium of claim 13, wherein the reference sequence value is a maximum or minimum sequence value in the set of the wireless signals received by the wireless communication devices of the wireless communication system.

15. The non-transitory computer-readable storage medium of claim 13, wherein computing the time factor for each communication link comprises determining whether a maximum sequence value included in a subset of the wireless signals received on the communication link is within a threshold sequence range of the reference sequence value.

16. The non-transitory computer-readable storage medium of claim 9, wherein the operations comprise:
providing the sequence values as inputs to a neural network; and computing the time factors based on an output of the neural network.

17. A motion detection system comprising:
multiple remote sensor devices, each remote sensor device configured to detect motion of an object in a space based on a series of wireless signals received from other remote sensor devices, the wireless signals in the series being transmitted and received between respective pairs of the remote sensor devices and comprising sequence values based on beacon wireless signals from a hub device, wherein the sequence value represents a time position of the wireless signal within the series of wireless signals; and
the hub device communicably coupled to the remote sensor devices and configured to:
compute time factors for each communication link between respective pairs of the remote sensor devices based on the sequence values included in the respective wireless signals transmitted and received between the pairs of the remote sensor devices;
compute weighted motion indicator values for each communication link between respective pairs of the remote sensor devices based on the time factors; and
determine a location of the detected motion in the space based on the weighted motion indicator values for the communication links between the respective pairs of the remote sensor devices.

18. The motion detection system of claim 17, wherein the remote sensor devices and the hub device form a wireless mesh network.

19. The motion detection system of claim 17, wherein:
each remote sensor device is configured to compute, for each communication link between the remote sensor device and another remote sensor device, a motion indicator value representing a degree of motion detected by the remote sensor device on the communication link, the motion indicator value being based on a subset of the series of wireless signals that are transmitted or received on the communication link.

20. The motion detection system of claim 19, wherein the hub device is configured to:
weight each motion indicator value by an associated time factor, the associated time factor being for a same remote device as the motion indicator value.

21. The motion detection system of claim 17, wherein the hub device is configured to compute the time factors by:
selecting a reference sequence value from among sequence values included in a set of the wireless signals received by the remote sensor devices of the motion detection system, and
computing the time factors for each communication link provided by each of the respective pairs of the remote sensor devices, wherein the computing of the time factor for each communication link is based on a determination of whether the sequence values in the wireless signals received on the communication link are within a threshold sequence range of the reference sequence value.

22. The motion detection system of claim 21, wherein the reference sequence value is a maximum or minimum sequence value in the set of the wireless signals received by the remote sensor devices of the motion detection system.

23. The motion detection system of claim 21, wherein computing the time factor for each communication link comprises determining whether a maximum sequence value included in a subset of the wireless signals received on the communication link is within a threshold sequence range of the reference sequence value.

24. The motion detection system of claim 17, wherein the hub device is configured to:
provide the sequence values as inputs to a neural network; and
compute the time factors based on an output of the neural network.

* * * * *